Sept. 19, 1967  B. EDWARDS  3,341,893
APPARATUS FOR FORMING DOUBLE THICKNESS FINS
IN A THIN WALL PLASTIC CONTAINER
Filed Sept. 23, 1963  10 Sheets-Sheet 1
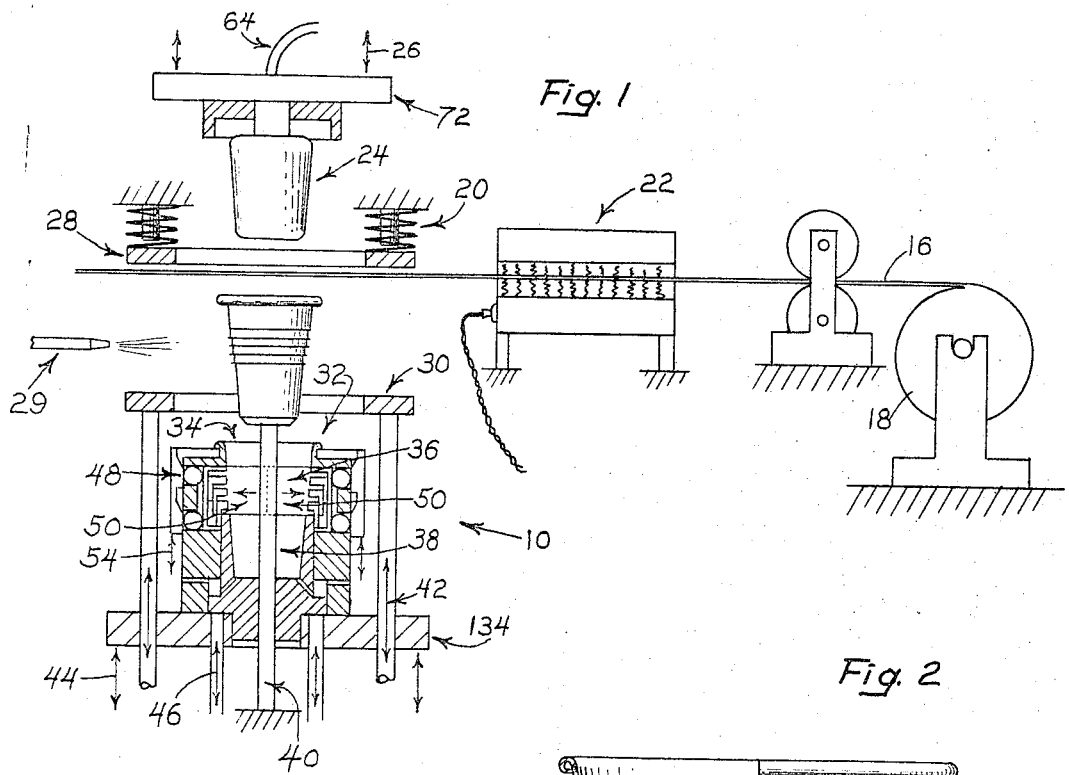
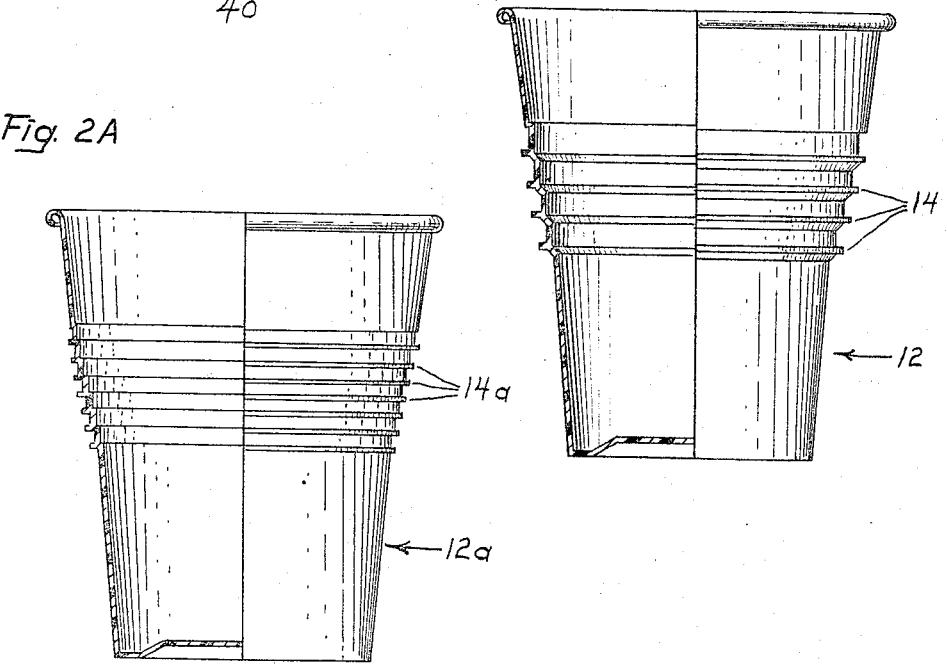
INVENTOR.
Bryant Edwards
BY
His Att'ys

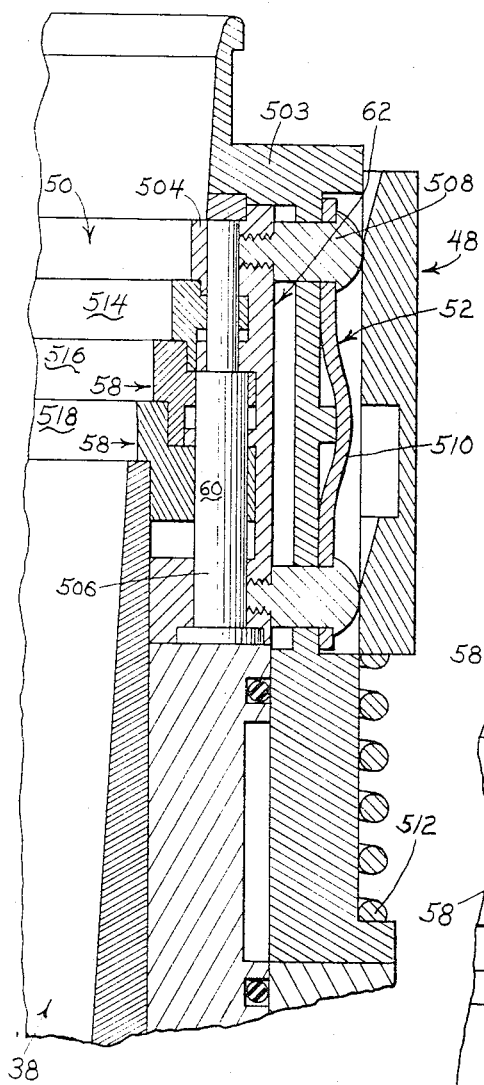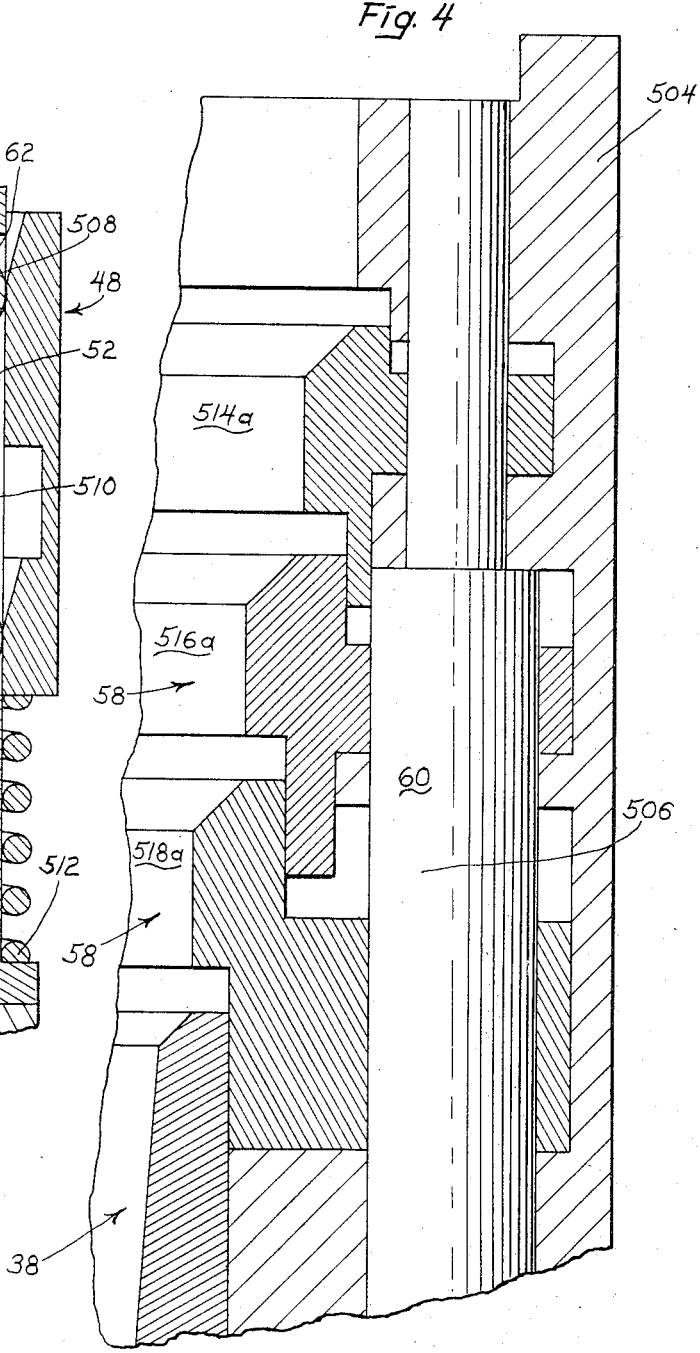

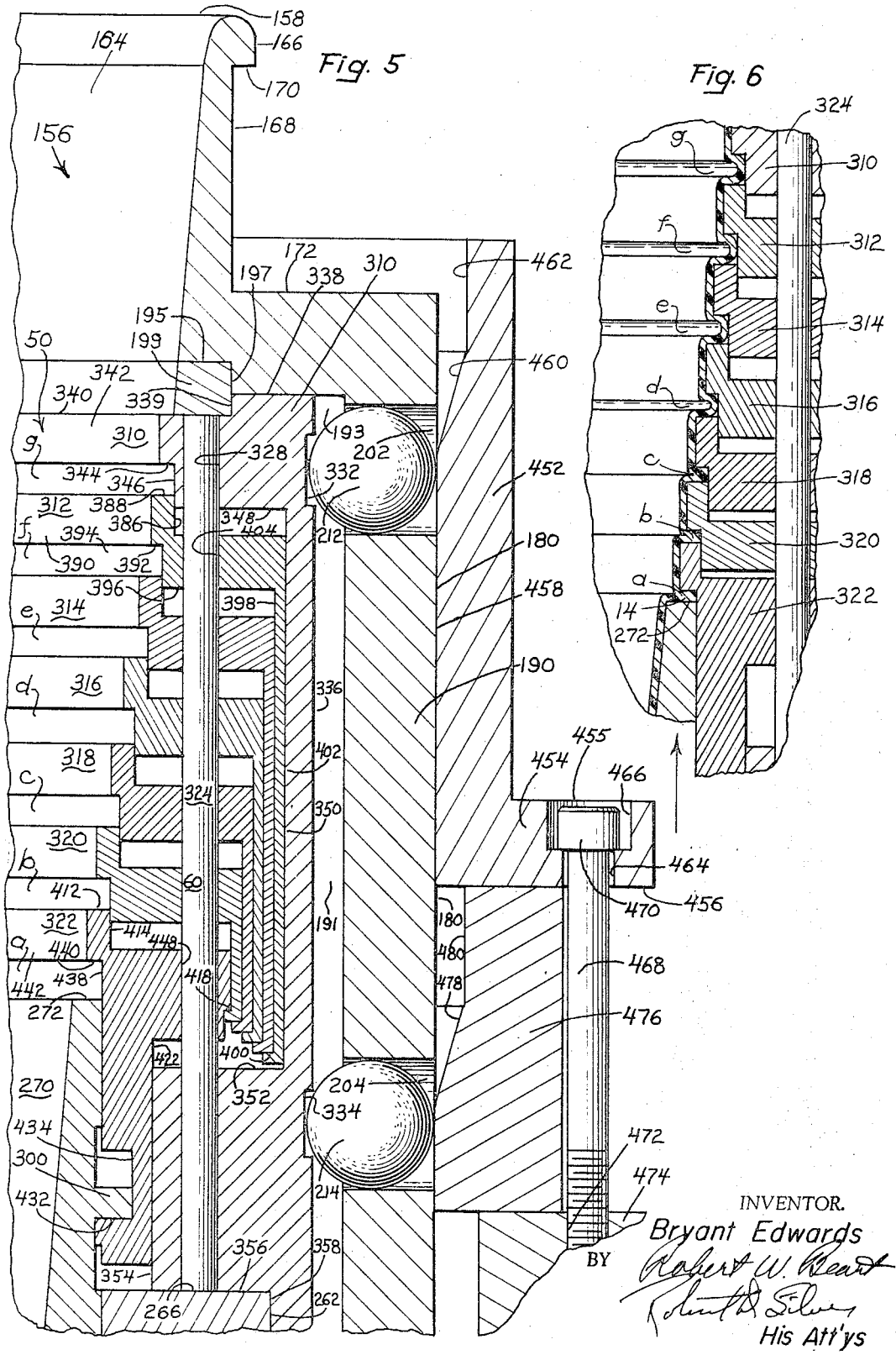

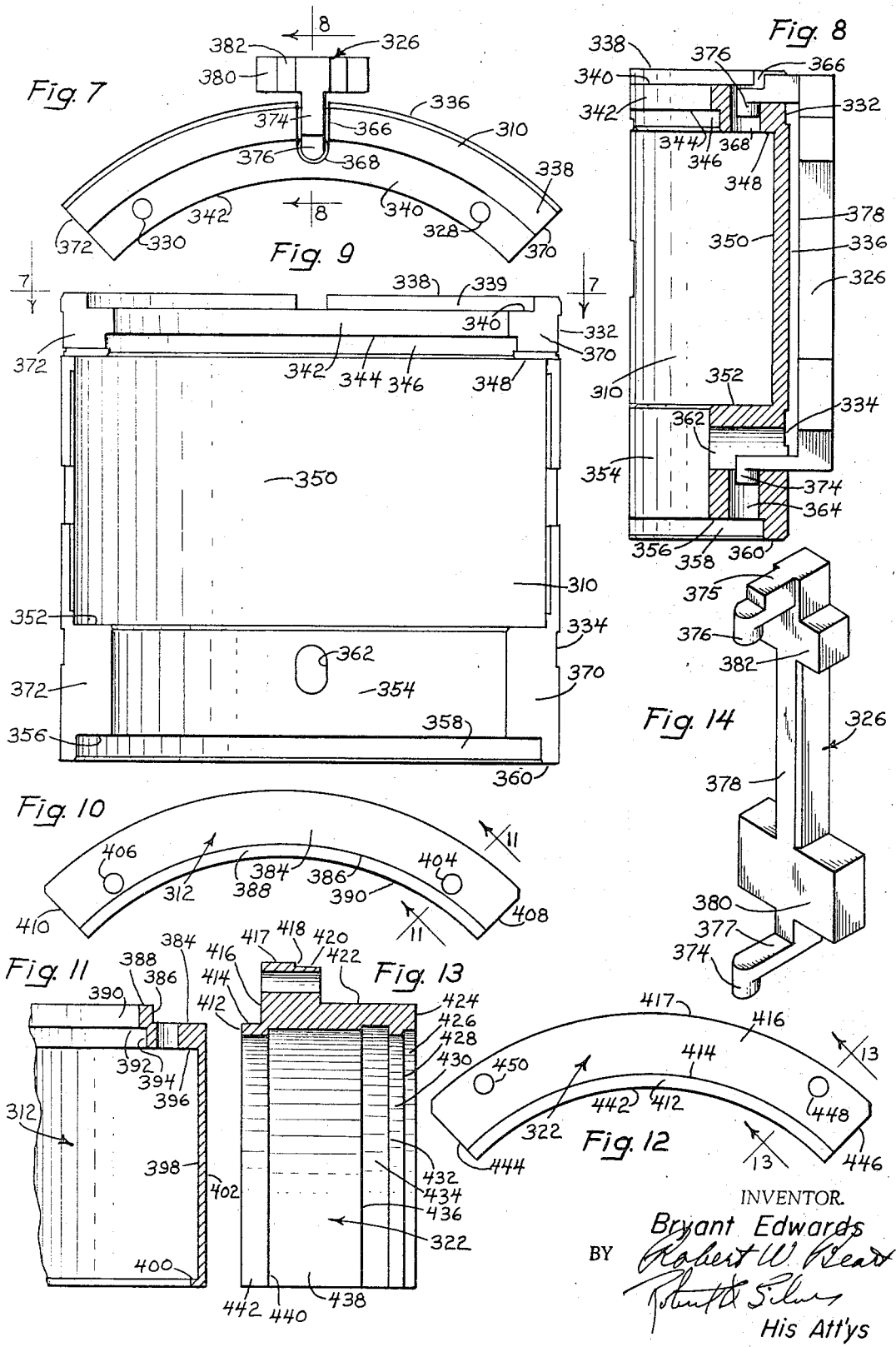

INVENTOR.
Bryant Edwards
BY
His Att'ys

INVENTOR.
Bryant Edwards
BY
His Att'ys

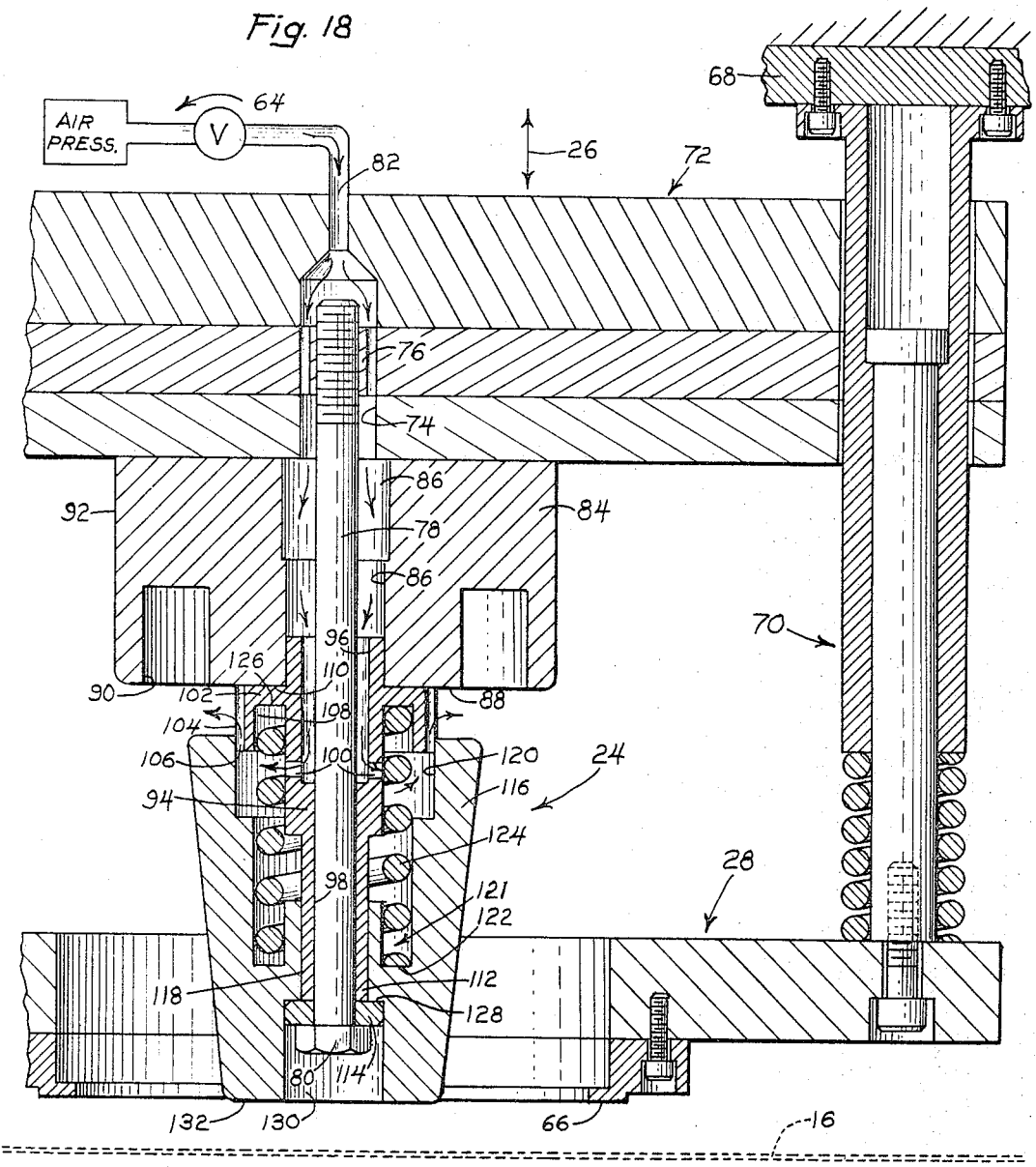

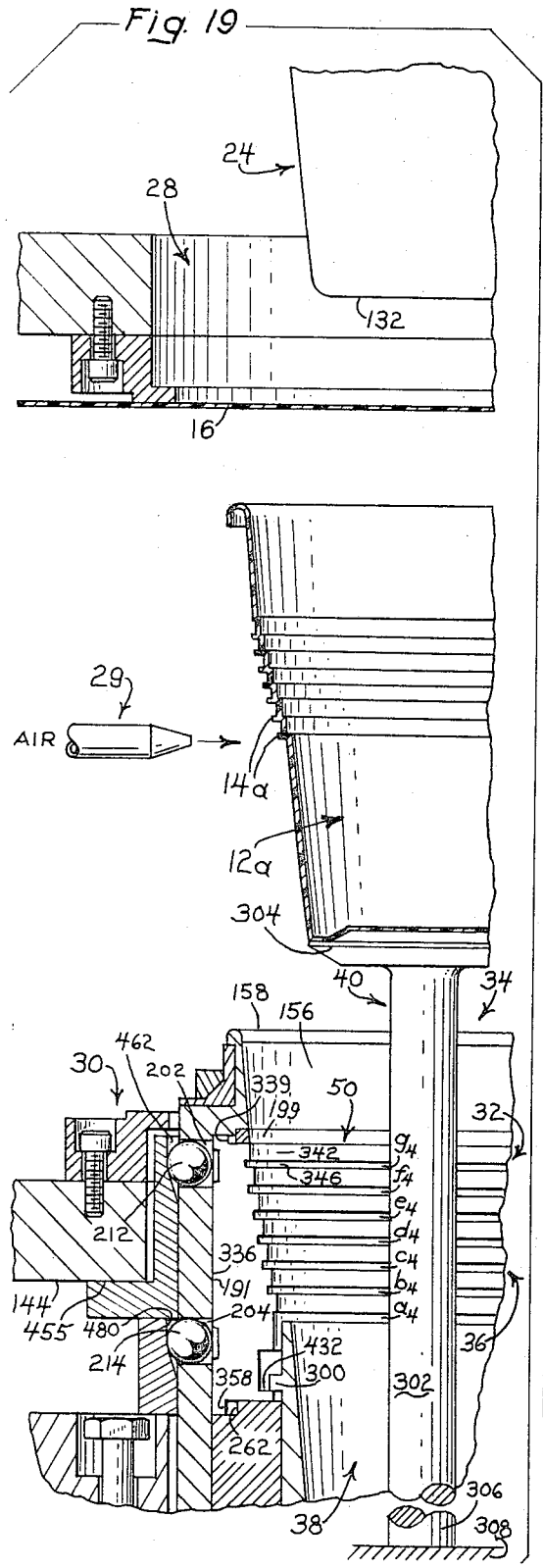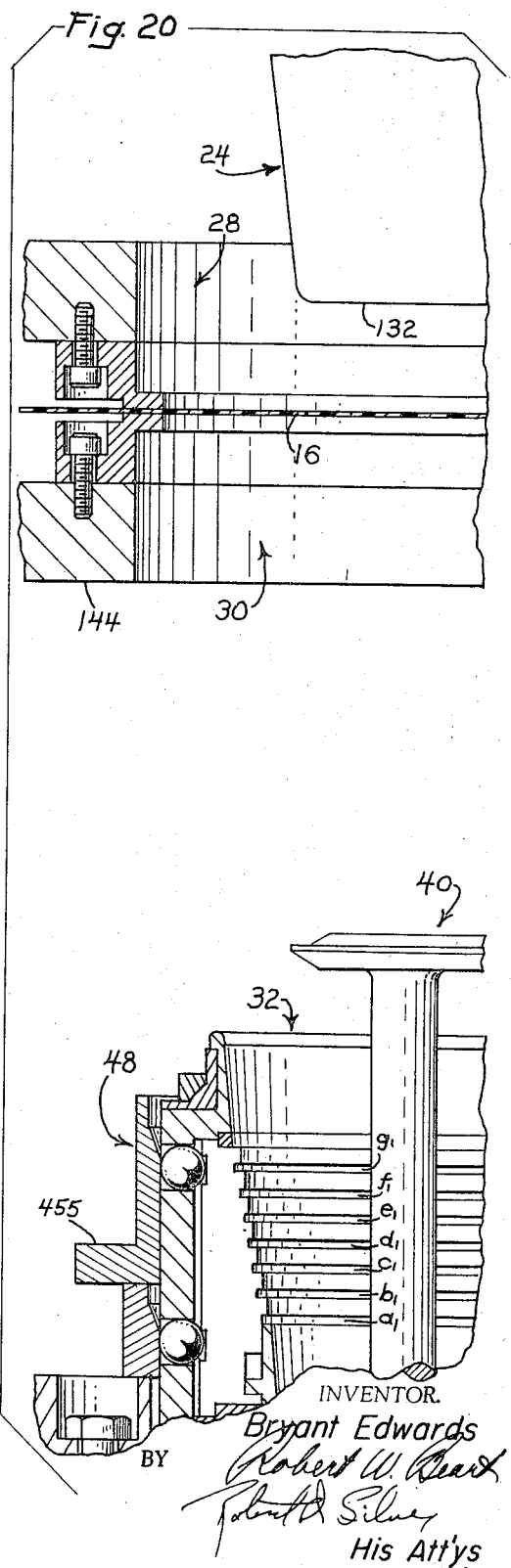

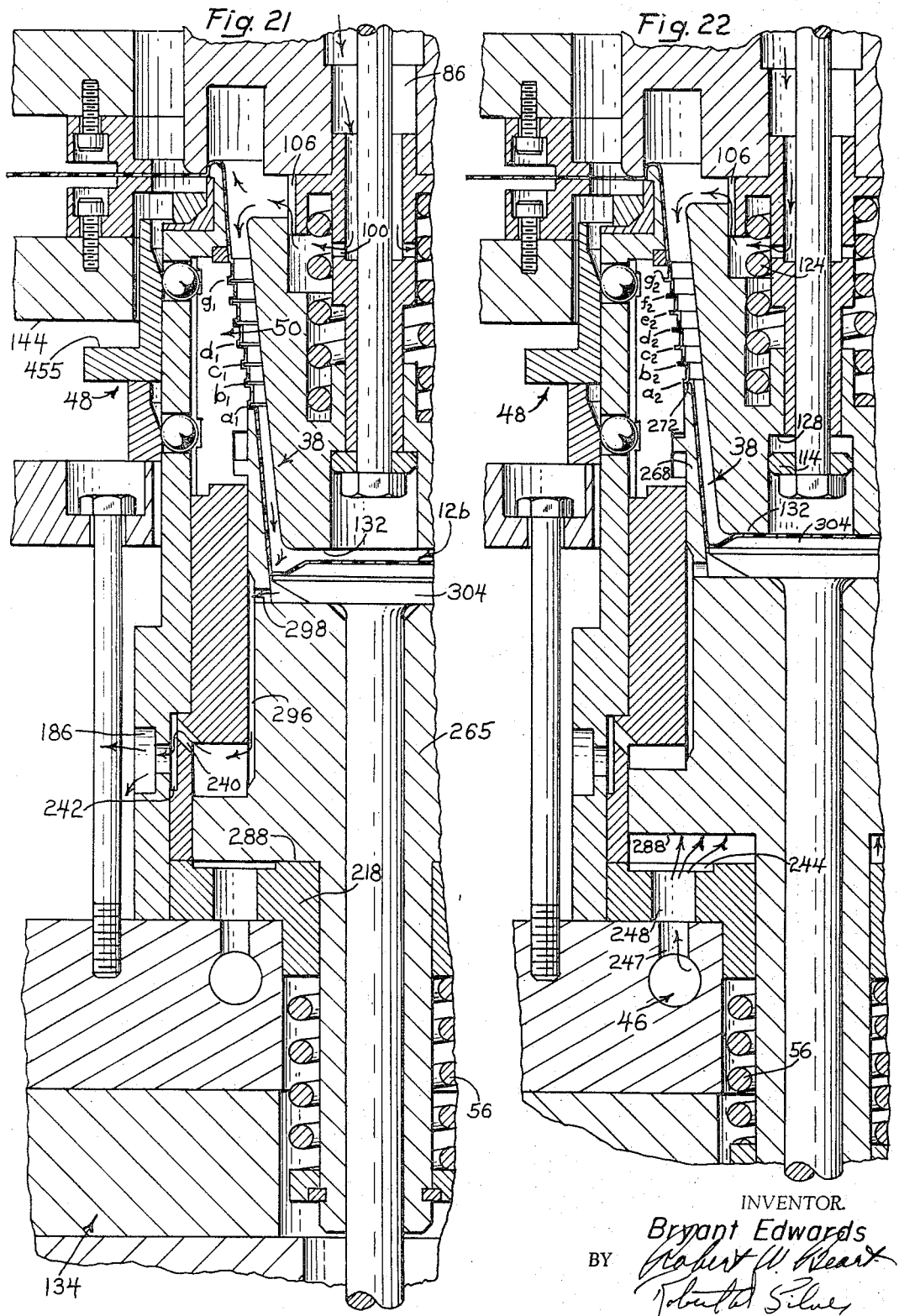

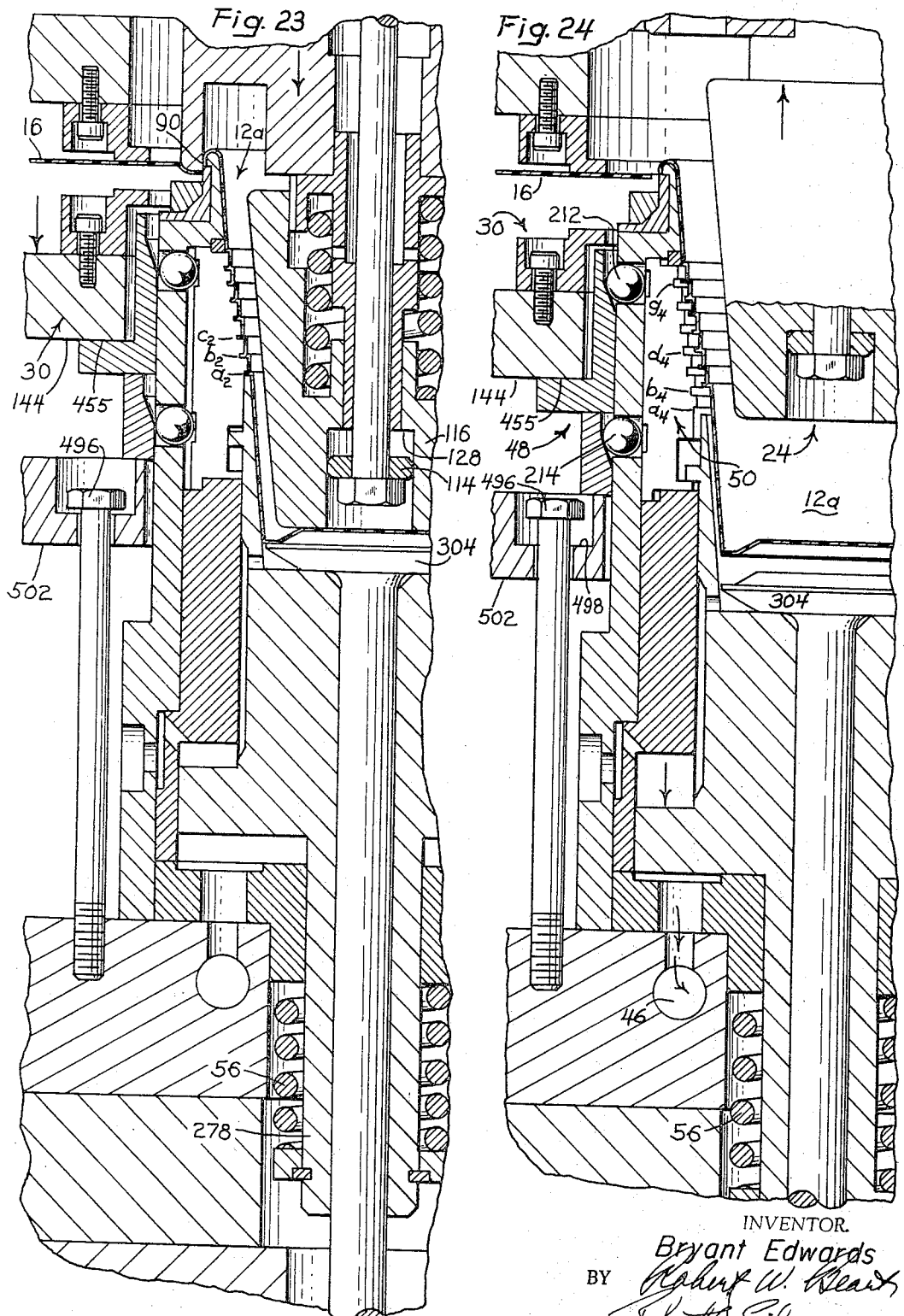

United States Patent Office 3,341,893
Patented Sept. 19, 1967

3,341,893
APPARATUS FOR FORMING DOUBLE THICK-
NESS FINS IN A THIN WALL PLASTIC
CONTAINER
Bryant Edwards, Clarendon Hills, Ill., assignor to Illinois
Tool Works Inc., Chicago, Ill., a corporation of
Delaware
Filed Sept. 23, 1963, Ser. No. 310,666
20 Claims. (Cl. 18—19)

ABSTRACT OF THE DISCLOSURE

An apparatus for forming a thin wall plastic container from thermoplastic sheet material with double thickness ribs formed in the side wall of the container to provide insulating and rigidifying characteristics thereto.

---

It has long been desired to have an economical plastic container for use with hot beverages, food, etc., the type where the user is not subjected to discomfort from the heat transfer of the hot beverage disposed within the container. In particular, it has long been desired to have a plastic container of the so-called "throw-away" or disposable type which will serve this need. Such a container is shown in my copending application Ser. No. 244,615 filed on Dec. 14, 1962, and entitled, "Plastic Cup With Fins," now Patent No. 3,223,305. The container shown and discussed in said application, in order to have usefulness, must be produced in an economical manner by automatic machinery in a fast and repetitive process. The instant method and apparatus is particularly efficacious to produce the above described container set forth in the aforementioned patent application. However, I have also discovered that the techniques utilized to produce the aforementioned container has application in further and wider fields of manufacture and thus, those aspects of the following specification when used to describe the process of making the particular ribbed container described in my aforementioned patent application should be considered as illustrative rather than limiting.

In its broader aspects the instant apparatus relates to an apparatus for forming projections in moldable sheet material and is particularly adapted to forming projections on very thin sheet plastic material, i.e., in the neighborhood of .003 to .020 of an inch thickness. Further, the projections may be formed in a precisely controlled manner on hollow articles of manufacture, said projections being continuous or discontinuous, vertical, horizontal or combination thereof as well as curvilinear. For example, a series of discrete sharply angularly divergent rings in the form of horizontally projecting ribs may be formed in the side walls of a cup, or if desired vertical ribs, sinusoidal ribs and/or other or various zig-zag arrangements as suitable and desired may be formed in plastic containers and as will become clear from reading the following specification. It is also possible to use the instant method and apparatus for forming deep undercuts in hollow container articles as well as to form ribs, closed or open grooves, or closed or open projections in thermoplastic material.

In the art of forming containers and the like from plastic materials of the thermoplastic variety, two major methods have been used heretofore, namely, that of injection molding and the second type which may be denominated as sheet forming (either flat or tubular). In the latter method, a pressure differential is created across a web or membrane of thermoplastic material to cause it to move into engagement with a mold member. The apparatus to be discussed hereinafter in greater detail generally relates to the second type of molding process and the preferred apparatus employs the combination of using a pressure differential along with the mechanical drawing of flat sheet stock to obtain uniformity of distribution of material in the finally desired article particularly in articles where the depth of draw exceeds the diameter of the mouth of the article to be formed. In flat sheet forming those articles of manufacture where the diameter of the open mouth exceeds the depth of draw, or where extruded tubes are blown or drawn against a mold, the use of a plunger may not be needed.

While containers may be formed from flat sheet stock by blow molding or vacuum molding processes without any mechanical engagement of the web of heated thermoplastic material to form a container, various types of prestretching of the web of material are often employed before contacting the sheet material with the mold. The instant method and apparatus is applicable with suitable modifications, to these types of forming operations sometimes known in the trade as billow forming or snap back molding as well as some types of drape forming.

In the preferred apparatus the web or sheet stock material is indexed intermediate clamp means having a diameter slightly greater than the outline of the mold surface and the material is mechanically drawn to a first preform shape. The female mold means is then telescopically moved into surrounding relationship to the first preform stage of the container and a pressure differential is introduced to cause the thermoplastic material to be blown or drawn into contact with the chilled mold cavity. (The preferred method is to use an air pressure differential by using positive pressure through the mandrel since it simplifies the structure of the instant apparatus but this is intended to be illustrative rather than limiting.) In some prior art machines, the next step in the operation was to sever the drawn formed thermoplastic material from the remaining web stock and to eject the finished item from the female mold and then start a new cycle. However, the instant apparatus are directed toward that portion of a molding cycle as above described during the period intermediate the period of the engaging of the heated sheet stock material with the mold cavity and ejection of the article from the mold in a severed or unsevered condition.

One prior art apparatus shown in the copending application assigned to the same assignee having Ser. No. 840,611, filed Sept. 17, 1959, entitled, "Forming Machine," now Patent No. 3,105,270, cycles a multi-cavity mold in less than three seconds. The time element is quite important in apparatus of this type as will be appreciated, since the plastic sheet material is very thin as it is being formed, the engagement thereof with the chilled mold cavity causes an almost instantaneous (measured in fractions of a second) chilling and setting of the article. This is dependent upon the temperature differential of the mold surface to the heated sheet and the thickness of the material employed, but in usual practice it is found that the material will set up in something less than one-tenth of a second although precise measurement is quite difficult. It is within this one-tenth of a second period (when operating with very thin sheet) that I prefer to accomplish movement of opposed surfaces within the mold so that the surfaces will be squeezed together, squeezing the heated sheet material trapped therebetween to be caused to be crushed together to form a double thickness projecting rib which will self-adhere or at least sets up in double thickness form. Whether or not the material will self-adhere is a function of the time, pressure involved, and temperature of the heated sheet as versus the temperature of the mold. In many applications it is not necessary to have the folded portions self-adhere but structural and insulation benefits often accrue to the container side walls when self-adherence is accomplished.

It is a general object of this invention to provide an apparatus for forming integral projections in moldable plastic material, particularly in portions of hollow containers made from flat or tubular sheet plastic material.

It is a further object of this invention to provide an apparatus for molding a series of spaced projecting portions which are sharply angularly divergent from the wall portions of the container from which they are formed.

It is a further object to provide an apparatus for forming fins projecting from the side walls of the container, said fins projecting from the plane of the side walls a distance greater than twice the thickness of the side walls.

Still another object of this invention is to provide an apparatus for molding integral double thickness ribs on very thin sheet formed disposable containers in a fast repetitive automatic process.

Still another object of this invention is to provide an economical apparatus for molding projecting ribs in a sheet formed article that are particularly well adapted for multi-cavity molding.

Still another object of this invention is to provide an apparatus for molding projecting ribs in the side walls of a hollow sheet formed article wherein movements of portions of the mold are primarily along the axis of the mold and transverse to the major plane of the sheet material being indexed to the molding apparatus, there being very short radial movement of certain portions of the mold whereby a large number of mold cavities may be closely packed together on a mold platen for producing a minimum amount of scrap material.

Still another object of this invention is to provide an apparatus for moving various portions of a chilled mold to cause creation of ribs in the side walls of a container, with a rectilinear motion, i.e., from initial position upwardly then outwardly then downwardly then back inwardly to successively perform the functions of, folding the side walls into ribs, clearing the side walls for easy ejection of the container, reorienting various mold portions while separated and return to initial position.

It is a further object of this invention to provide an apparatus for forming a series of spaced horizontally projecting ribs in the side walls of a generally frusto-conical container by disposing preformed sheet material into engagement with spaced movable mold elements in such a manner that movement of one of the movable mold elements causes movement of the next movable mold element in a cascading-like arrangement so that the pressure transmitted to the first movable mold element will in turn transmit pressure to the second mold element so that there is uniformity of pressure on all of the movable mold elements so that there will be in turn uniform pressure on all of the elements forming the ribs of the container and thus uniformity of ribs or at least fully formed ribs independent of variations of sheet material thickness.

It is a further object of this invention to provide a high quality production molding apparatus which have high volume production capacity, which are relatively low in maintenance cost, are trouble-free in operation, and are otherwise well designed for the purposes set forth herein.

The novel features that are characteristic of the invention are set forth with particularity in the claims. The invention itself, however, both as to its organization and its mode of operation, together with additional objects and advantages thereof, will best be understood by the following description of specific embodiments when read in connection with the accompanying drawings in which:

FIG. 1 is a semidiagrammatic view, partially in section, illustrating apparatus for molding the article shown in FIGS. 2 and 2A;

FIGS. 2 and 2A are front elevational views, each partially in section, illustrating articles made by the apparatus shown in FIG. 1, the cross section of the side wall thickness of the articles being considerably enlarged for pictorial representation since the side wall thickness of one commercial form of the articles as molded is in the neighborhood of 4–10 thousandths of an inch;

FIG. 3 is a partial sectional view of a portion of one form of mold means for forming ribs in the side wall of a container;

FIG. 4 is a fragmentary view of a portion of FIG. 3 in greatly enlarged scale, there being a small modification of the insert means which changes the contour of the side walls of the container;

FIG. 5 is an enlarged fragmentary sectional view of a preferred form of a quadrant of a mold means similar to FIG. 3 showing a portion of the detailed mold means rib imparting structure, said structure being shown in outline form only in FIG. 17;

FIG. 6 is a fragmentary sectional view, in slightly reduced scale, of the mechanism shown in FIG. 5, said view being taken after partial actuation thereof;

FIG. 7 is a fragmentary top elevational view of a quadrant insert holder portion of the assembly shown in FIG. 5;

FIG. 8 is a sectional view along lines 8—8 of FIG. 7;

FIG. 9 is a front elevational view of a quadrant insert holder shown in FIGS. 7 and 8;

FIG. 10 is a top elevational view of an insert member which cooperates with the holder shown in FIGS. 7 through 9 which is also shown in FIGS. 5 and 6;

FIG. 11 is a sectional view along lines 11—11 of FIG. 10;

FIG. 12 is a top elevational view of another insert member shown in FIGS. 5 and 6 similar in certain respects to the one shown in FIGS. 10 and 11;

FIG. 13 is a sectional view along lines 13—13 of FIG. 12;

FIG. 14 is a perspective view of a spring engaging member shown in FIGS. 7 and 8 which cooperates with the spring member shown in FIGS. 16 and 16A;

FIG. 18 is a sectional view of a single mandrel means cooperable with the mold means of FIG. 17; and FIGS. 19 through 24 are sequential views showing the relative positions of the parts of the mold means and mandrel means shown in FIGS. 17 and 18 during a cycle of the apparatus.

Figure 15:
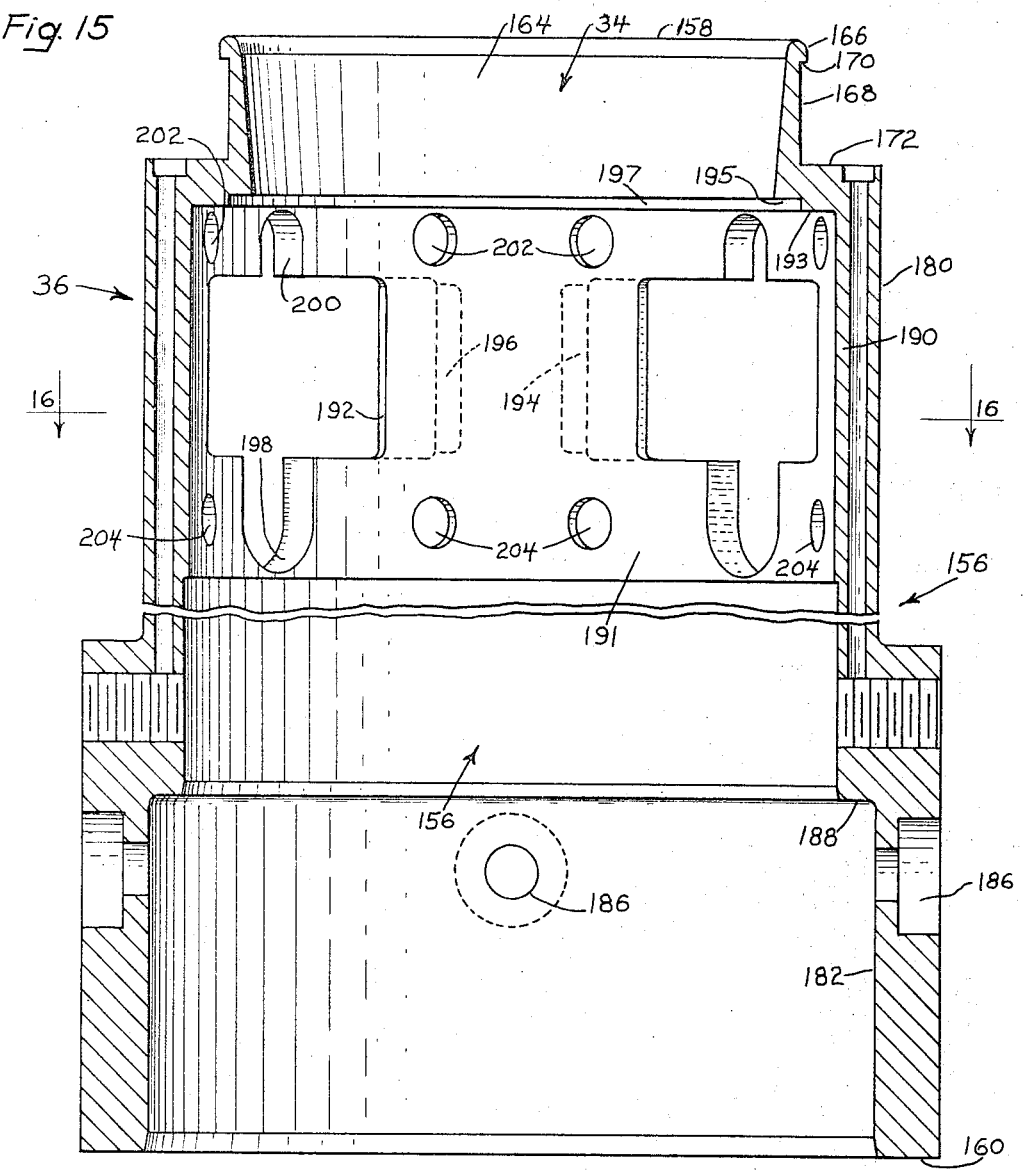
FIG. 15 is an enlarged fragmentary sectional view of a portion of the mold assembly shown in FIG. 17.

Returning now to FIGS. 1, 2 and 2A of the drawings, the invention relates to an apparatus 10 and a method which is designed to manufacture thin wall products such as containers 12 having projecting ribs 14 from sheet stock material 16. While this specification will discuss the apparatus 10 and the method in terms of manufacture of the cups as shown, the term cups or containers should not be considered limiting as the invention has wide application to the manufacture of plastic articles of many sizes, shapes, natures, and uses.

Before describing the apparatus in detail, it will perhaps be helpful to discuss the major components of the apparatus and manner in which it functions. The apparatus 10 is designed to receive a web of suitable thermoplastic material 16 for example polystyrene, polyethylene or the like, from a suitable supply roll 18, the web being fed into the apparatus by suitable feed means not shown. The feed means accurately and intermittently supplies the web 16 to the forming station 20, passing the web in proximity to heating means 22 which brings the web to suitable molding temperature. One such suitable machine is shown in patent application entitled, "Forming Machine," having Ser. No. 840,611, filed Sept. 17, 1959, and assigned to the same assignee. Said application describes a mechanically actuated machine, i.e., a motor and cam actuated forming machine, however, it is to be particularly noted that in many instances it may be desirable to duplicate the essential motions of that machine hydraulically.

At the forming station 20, a mandrel means 24 under the control of an actuator means 26 (shown semidiagrammatically) is operable to engage and mechanically predraw a circular area of web 16 which is clamped between an upper relatively fixed clamp means 28 and a movable lower clamp means 30. A mold means 32 is movable upwardly into surrounding relationship to the plastic material disposed on the mandrel means, said plastic material closely hugging itself to the mandrel means out of contact with the mold means except at the extreme lip portion.

The mold means 32 is preferably chilled and comprises three distinct mold means portions as viewed in a horizontal plane. The first portion means 34 is relatively fixed and defines the open mouth (lip and extreme upper side wall portion) of the mold cavity, the second portion means 36 and third portion means 38 being relatively movable to the first portion means 34. The third portion means 38 defines the bottom of the mold cavity and the extreme lower portions of the side walls and is movable in a vertical plane. The second portion means 36 is intermediate the first and second mold portion means and has subportions thereon movable in a vertical and a horizontal direction as shall be explained.

Knock-out means 40 is provided for ejecting the container after the formation thereof, said knock-out means being relatively movable to the third portion means 38.

It is important to note that the lower clamp means 30 is actuated separately by actuator means 42 (shown semidiagrammatically) from the movement of the mold means 32 in gross. The mold means 32 is actuated by actuator means 44, there being separate actuator means 46 for causing movement of the third portion means 38. Movable cam means 48 is surroundingly disposed to the second portion means of the mold means.

Returning to the second portion means 36 of the mold means, it will be observed that it comprises four quarters 50 each of which is a quadrant segment of the mold substantially identical to the others. Each of the quarters 50 have a first position to define an initial midportion of the side wall cavity mold surface and are biased outwardly from this position by biasing means 52 shown in FIGS. 3, 16 and 16A. The cam means 48 restrains the quarters 50 against the bias of the biasing means 52, the apparatus being such that actuation of the cam means 48 will allow the quarters to move radially outwardly. Means 56 is provided for biasing the third portion means 38 of the mold means downwardly, said biasing means being shown in FIG. 17. The aforementioned subportions of the second portion means 36 comprise individual movable member means 58 which are provided on each quarter 50 for movement on a guide means 60, each guide means being fixed to and a part of an insert holder means 62 for each quarter 50.

Pressure differential means 64 for creating a pressure differential across the web of material after it has been mechanically predrawn will be discussed as a positive pressure being introduced through the mandrel means 24 although it will be readily appreciated that a vacuum means associated with mold means will be operative to draw the material against the mold means. After the material has been mechanically predrawn by the mandrel means 24 and the mold means 32 surroundingly disposed to the predrawn material, a pressure differential is created to cause the material to engage the chilled mold means 32. Almost instantaneously the third portion means 38 is actuated upwardly by actuating means 46 to cause individual member means 58 on the quarters 50 to squeeze material trapped therebetween into a rib-like formation on the side walls of the container. The lower clamp means 30 is then actuated downwardly to engage the cam means 48 to allow the quarters 50 to move radially outwardly under the bias of the biasing means 52 for the quarters so that the quarters leave contact with the rib surfaces and afford a clearance so that the knock-out means 40 may cause the container to be ejected from the mold as the mold is retracted.

The finally formed container is preferably severed from the sheet by relative movement of the mandrel means 24 to the first portion means 34 at some time during the molding cycle rather than severing the formed article from the sheet at a later station.

Now to a more detailed discussion of the apparatus and its functions, and the methodology employed in the instant invention. Attention is invited to FIGURE 18 which shows, in somewhat diagrammatic form, the upper clamp means 28 having a ring-like clamping surface 66 mounted to a fixed portion of the molding machine 68 through a spring loaded connection 70 which provides take-up adjustment of irregularities in the sheet. For purposes of discussion the upper clamp means 28 is treated as being relatively fixed to the molding apparatus. Mandrel platen means 72 mounts the mandrel means 24 therebelow, said platen means and the mandrel means being relatively movable to the upper clamp means 28 by a suitable actuator either mechanical or hydraulic shown diagrammatically by the arrow 26.

The mandrel platen means 72 is formed with a bore 74 for threadedly mounting at 76, a depending bolt 78 having an enlarged head 80. The bore 74 and the threaded engagement with the bolt 78 is done in such a manner that a passageway is provided for communication with the pressure differential creation means 64 through passageway means 82 so that air may be selectively supplied under pressure to the mandrel means 24. A sealing and die cutoff member 84 is fixed to a platen means 72 and is surroundingly mounted to the bolt 78. Member 84 is formed with a central bore 86 for communication with the bore 74 and passageway 82. Member 84 has a bottom surface 88 and is formed with a large annular groove 90 which intersects surface 88 to form a sealing and die cutoff edge 90 which cooperates with the lip of the mold means for sealing and severing the sheet during formation of the molded article. The outer diameter of member 84 is shown at 92 is less than the inner diameter of the upper clamp ring member 66 for projection therethrough as shown in FIGS. 21–23.

An irregularly shaped slide and spring retainer member 94 is surroundingly disposed to bolt member 78 and is formed with a counterbore 96 at the upper end thereof having a larger diameter than the bolt 78 and a bore 98 which rather snugly fits on bolt 78 adjacent the lower end thereof. Transverse communicating passageways 100 extend through the side walls of member 94 to communicate with counterbore 96 and thus passageway means 82.

Adjacent the upper end of member 94 is a radially enlarged portion 102 having an outer diameter surface 104 for sliding cooperation with plug member 116. A groove in the under side of portion 102 provides depending edge portion 108 and defines a spring retaining chamber. The upper surface of portion 102 provides a shoulder 110 which snugly engages surface 88 of member 84. Vertical grooves 106 in surface 104 provide a further passageway for the air pressure and communicate with passageways 100. Member 94 is held firmly clamped to member 84 with shoulder 110 engaging surface 88, the other end 112 of member 94 engaging washer 114 which in turn is engaged and clamped in position by the head 80 of bolt member 78.

A plug member 116, preferably formed of nylon, Teflon or the like is formed with a bore 118 for sliding engagement with the small O.D. of member 94. A larger counterbore 120 formed therein engages the large O.D. 104 of member 94 so as to maintain accurate sliding movement of the plug 116 relative to member 94. An internal coaxial groove means 121 provides an inner shoulder surface 122 which receives one end of a compression spring 124 which is compressed between shoulder 122 and spring receiving opposed shoulder surface 126 on member 94. The bias of spring 124 causes shoulder 128 formed by the junction of lower counterbore 130 and bore 118, to engage washer member 114 while permitting relative movement of the plug 116 along member 94 upwardly toward the die and sealing member 84 and the mandrel platen means 72. As will be apparent the counterbore 130 receives the head 80 of bolt member 78 therewithin. The end surface 132 of the plug 116 thus may move upwardly relative to the mold platen means 72 for reasons hereinafter appearing. The spring 124 normally retains the parts in the position shown in FIG. 18 and has sufficient spring force so as to not collapse when mechanically drawing the plastic sheet material. It will be noted that passageway 104 remains open at all times (see FIGS. 21 and 22).

It will be realized that while only one mandrel means 24 has been discussed, it is expressly contemplated and the arrangements of the parts are of such a nature that a large number of mandrel means identical to one just discussed are to be closely arrayed on a mold platen means 72 for movement therewith, reference being had to the aforementioned patent application for a forming machine.

Figure 17:
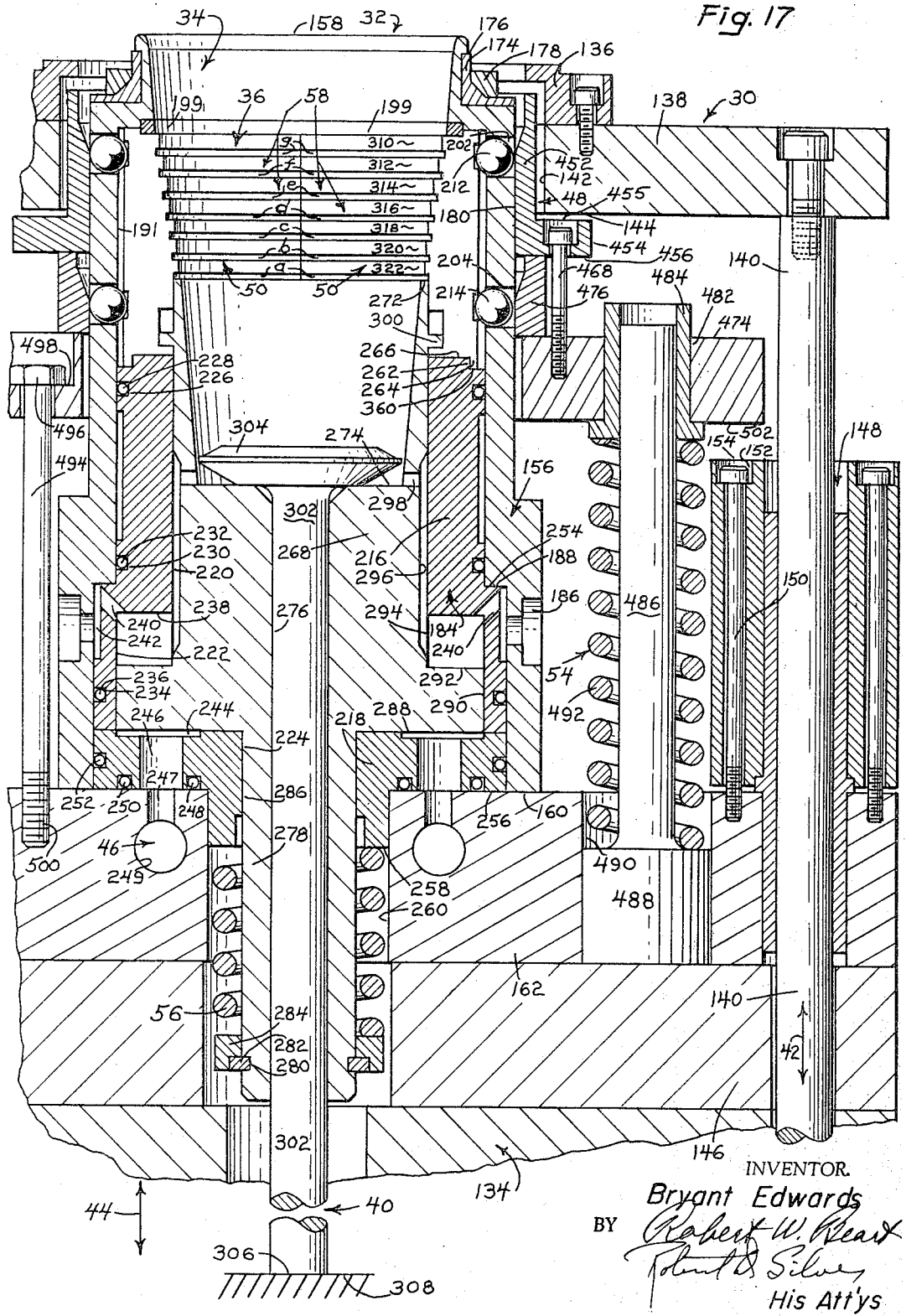
FIG. 17 is a partial sectional view through a single mold assembly, the quadrants in the side wall mold being left in semidiagrammatic outline form and being shown in FIG. 5 to avoid confusing detail.

Turning now to FIG. 17 which shows a sectional view of details of the mold assembly, a mold platen means 134 mounts the mold means 32 for movement therewith under the influence of an actuator means shown semidiagrammatically by the arrow 44, the actuator means may be mechanical or may be hydraulic. The lower clamp means 30 comprises a clamp ring 136 mounted to a clamp plate 138 with the clamping surface of the clamp ring 136 being in opposition to the upper clamp means 28. Plate 138 is mounted by suitable rods 140 for actuation under the influence of actuator means 42 separate and apart from the movement of the mold platen means 134. This may be accomplished mechanically in accordance with the teachings of the aforementioned patent application for a forming machine or may be accomplished hydraulically. The rods 140 extend through a bore 146 in the mold platen means 134 and are guided in their movement by a suitable bushing means 148 which is mounted to the upper part of the mold platen means 134 by suitable bolts 150 which have heads countersunk at 152 in the top of the bushing so that surface 154 is operable to provide a stop surface for purposes hereinafter appearing.

As aforementioned, the mold means 32, as viewed horizontally, comprises a first portion means 34, a second portion means 36 and a third portion means 38 as viewed from top to bottom of the outline of the mold cavity. The first portion means 34 comprises a mold housing means 156 of somewhat stepped cylindrical shape having a top surface 158 which defines the lip of the cavity and a bottom surface 160 which is fixedly mounted to member 162 which is a portion of the mold platen means 134. Mold housing means 156 always remains in fixed relation to member 162 in the instant apparatus. As shown in FIGS. 5, 15 and 17, the top surface 158 forms the lip of the mold with inner surface 164 defining the upper side walls of the container to be molded. Outer lip surface 166 curves away from the top 158, there being an undercut 168 to define a sharp shoulder 170. Offset and oppositely disposed to shoulder 170 is a radially extending shoulder 172 which, together with surface 168, receives a cylindrical cutoff member 174 which is preferably of split configuration being retained in position in the groove between shoulders 170 and 172 by a suitable retainer member 178. Corner 176 of member 174 and surface 166 cooperate with edge 90 on member 84 of the mandrel means, the material initially being trapped between surface of the counterbore 90 of the mandrel and surface 166 for sealing of the material, the cutoff of the formed article being accomplished by a shearing action between the edge 90 of the mandrel and edge 176 on insert member 174. The mold housing means 156 has a cylindrical O.D. at 180 which mounts the cam means 48 for relative movement thereon.

A counterbore 182 (see FIGS. 15 and 17) adjacent end 160 of the housing means 156 fixedly mounts a mold chilling air cylinder insert means 184 which is fixed to and concentric with the housing means 156. Shoulder 188 which defines the upper end of the counterbore 182 fixedly limits and positions the cylinder wall insert 184. A vent passageway 186 extends through the side walls of the mold housing 156 and forms a part of the passageway for venting the mold as will become apparent. There are several such vent passageways 186 (for example 4) spaced around the side walls of the mold housing.

In the horizontal area of the mold housing means 156 which delineates the second portion means 36 of the mold housing means, the side walls 190 of the mold housing means 156 are formed with four symmetrically spaced apertures 192 more or less in the form of a curvilinear window in the side walls. Grooves 194 and 196 are formed in the midportion of the side walls adjacent the apertures 192 for receipt of the biasing means 52 in the form of a flat spring 206. It will be noted that the apertures 192 having a depending slot 198 and an upwardly extending oppositely disposed slot 200 both of which extend completely through the side walls 190.

Disposed immediately above and below the spring receiving slots 194 and 196 are through cylindrical apertures 202 and 204 for receipt of ball members 212 and 214 respectively.

Figure 16:
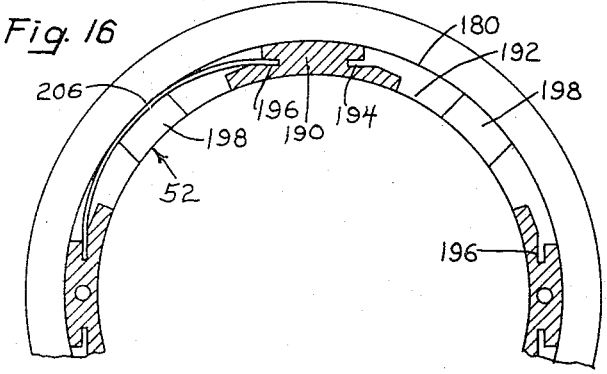
FIG. 16 is a sectional view taken along line 16—16 of FIG. 15, said view being on a reduced scale.
Figure 16A:
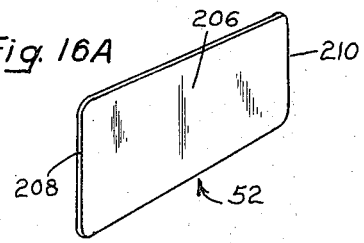
FIG. 16A is a perspective view of a flat spring member which cooperates with a mold member as shown in FIG. 16 and engages the member shown in FIG. 14.

The biasing means 52 in the form of a flat spring 206 is inserted in the slots so that the edge portions 208 and 210 are firmly retained in the slots 194 and 196. The spring is distorted by the insertion thereof to the position as shown in FIG. 16 and as is apparent from the mounting thereof the spring may be moved inwardly from the position shown and will try to return for purposes hereinafter appearing.

It will be appreciated that there are four apertures 192 in the side walls symmetrically spaced around the periphery, and four spring members 206 are individually inserted in the grooves 194–196 adjacent each aperture 192. It will be further noted that there are eight apertures 202 in the side walls 190 and also eight apertures 204 with corresponding ball members 212 and 214 disposed therein, the springs 206 being operable to bias the individual quadrants 50 outwardly into engagement with the balls 212 and 214, the exact position of the individual quadrants being determined by the position of the cam means 48 engaging the balls 212–214 as shall become apparent.

The air cylinder insert means 184 is generally cylindrical in shape and fits within the mold housing means 156. The cylinder insert means 184 may be of two piece construction having an upper body portion 216 and a necked-down lower portion 218 concentric to the upper portion. The upper portion may be formed with passageways therewithin for receipt of coolant fluid for chilling the lower portion of the mold assembly, such passageways not being shown. The upper portion 216 has a central bore 220 which receives the third portion means 38 of the mold means therewithin for movement relative thereto. Member 216 is formed with an annular counterbore 222 which defines a cylinder wall, there being a smaller central bore 224 in the necked-down lower portion 218.

An external annular groove 226 on member 216 is adapted to receive a sealing O-ring 228, said groove being located adjacent the top portion of member 216. Similar grooves 230 and 234 receive O-ring sealing means 232 and 236 as shown in FIG. 17, said O-rings providing a seal between the member 216 and the mold housing means 156. The juncture of bores 220 and 222 defines a transverse internal shoulder 238 which defines the upper maximum possible movement of the third portion means 38. A plurality of cross passageways 240 communicate with an annular exterior groove 242 to provide a vent passageway from the interior to the exterior of member 216 for venting the mold during the molding cycle as shall be explained. Groove 242 communicates with passageway 186 in the side walls of the mold member 156.

The necked-down lower portion 218 may be formed integrally with portion 216 or may be made separately for ease of assembly as shown. A face groove 244, which is annular in nature, is disposed in the upper surface of portion 218 to provide a passageway for hydraulic fluid or for air pressure to engage the underside of the third portion means 38 of the mold assembly. The groove 244 is in communication with a plurality of axially aligned bores 246 which are in turn in communication with a source of pressure 46 through passageways 247–249 formed in platen member 162. Suitable sealing means 248, 250 and 252 disposed in suitable annular grooves seal the bores 246 and the groove 244 relative to mold platen member 162 and the mold housing means 156.

The upper portion of member 216 has a shoulder 254 formed therein intermediate the axial extent thereof, said shoulder 254 engaging shoulder 188 of member 156 which fixes the location of member 216. As will be seen, surface 256 of member 218 engages mold platen portion 162, the members 216 and 218 being clamped between platen portion 162 and shoulder 188 of member 156 as shown in FIG. 17. The terminal lower annular surface of portion 218 forms an abutment shoulder 258 for engaging one end of the biasing means 56 for biasing the third portion of the mold means downwardly for purposes hereinafter appearing. As shown, the O.D. of necked-down portion 218 fits within and snugly engages a complementary bore 260 formed in the mold means platen portion 162. The disposition of the various sealing portions 228, 232, 236, 248, 250 and 252 assure that fluid pressure will not escape as it is received from the source 46.

At the upper end of portion 216, is an external annular step groove defined by surfaces 262 and 264 which together with top surface 266 cooperate with the quadrants 50 in a manner to be set forth hereinafter. As will be appreciated, the cylinder wall insert means 184 comprising the two portions 216 and 218 serve the various functions of providing a vent means for the mold means, provide the cylinder portion of an air or hydraulic cylinder, optionally may provide the mold chilling means, provides a guide means for guiding movement of the third portion means relative to the mold platen means, provide a relatively fixed surface for engaging one part of the biasing means to bias the third portion means in opposition to the air or hydraulic pressure emanating from the source 46, provides sealing means to prevent escape of the air or hydraulic pressure introduced from source 46, and provides a plurality of guide surfaces for guiding radial movement of the quadrants 50.

The third portion means 38 of the mold means includes the knock-out plug member 40 and the accurately machined relatively movable mold member 268. Member 268 has a cup-shaped cavity at the upper end having converging side walls 270 which terminate in a horizontally aligned upper surface 272. The bottom of the cup-shaped cavity has a transverse surface 274, the walls 270 and the bottom 274 defining the bottom portion and lower side walls of the mold cavity. Member 268 is formed with a through central bore 276 intersecting surface 274 and the lower portion of member 268 has a necked-down portion 278 having a groove 280 adjacent the lower end thereof for receipt of an annular stop member 282 in the form of an E-ring or the like. A spring retainer member 284 engages the stop member 282, said spring retaining member engaging the spring biasing means 56 in engagement with shoulder 258 to thereby bias member 268 downwardly at all times. As can be seen in FIG. 17, the O.D. of the necked-down portion 278 at 286 slides in bore 224 of the lower cylinder wall insert means 218.

Member 268 has a large transverse shoulder surface 288 disposed in opposition to groove 244 to provide a surface upon which the fluid pressure emanating from source 46 is directed to move member 268 upwardly against the bias of the spring 56. The largest O.D. 290 of member 268 rides on the cylinder wall 222. A transverse shoulder portion 292 is spaced from surface 298 and is initially spaced from shoulder 238 of member 216 a distance greater than the amount of movement of member 268 in an upwardly direction. Thus, venting grooves 296, which are recessed from the intermediate O.D. 294 are in constant communication with vent holes 240 in member 216, grooves 296 being in communication with cross vent holes 298 which communicate to the interior of the mold cavity. The intermediate O.D. 294 rides upon and is guided by the bore 220 of the cylinder wall insert means 184.

At the upper end of member 268 is an outwardly extending boss 300 (which may be of split ring construction for assembly purposes) which forms part of an interlock means relative to the quadrants 50. This boss 300 is annular in nature and serves to engage the individual quadrants 50 to positively return the individual insert members therein to their original positions as will become clear in the description of the quadrants per se. The knock-out means 40 is in the form of a rod member 302 having a head 304 which provides the effective bottom of the mold cavity. The diameter of the head 304 is slightly less than the diameter of the side walls 270 adjacent thereto so that a small venting passageway for egress of trapped air is provided past the head 304 through the passageway 298–296 etc., to the exterior of the mold cavity. The end of the rod 302 terminates at 306 to in turn engage a portion of the frame 308 shown semidiagrammatically. Thus, when the mold platen means 134 as a unit, receeds downwardly, the end 306 will engage the frame 308 so that the knock-out member will move relative to the mold cavity to cause a formed container to be ejected through the mouth of the mold. It will be appreciated that the end 306 is normally spaced from the frame portion 308 during the molding operation and thus, it will move with member 268 in an upwardly and downwardly direction.

The second portion means 36 of the mold cavity comprise four identical individual quadrants 50. These quadrants are shown in outline form only in FIG. 17 to avoid confusing detail. A greatly enlarged sectional view of this area is shown in FIG. 5 and various fragmentary views of some of the components are shown in FIGS. 7 through 14.

More particularly, each quadrant 50 comprises an insert holder member 310 having movable elements 312, 314, 316, 318, 320 and 322 mounted thereon. A pair of rod means 324, which form a portion of the guide means 60 for the insert members 312 through 322, are mounted in apertures 328 and 330 at opposite ends of member 310. A spring retaining member 326 engages member 310 and is in turn engaged by the spring member 206 shown in FIG. 16A as shall become apparent.

As can be seen in FIGS. 7 and 9, the member 310 is a quarter segment of an annulus and the O.D. is formed with a pair of spaced grooves 332 and 334 for receipt of the ball means 212 and 214 respectively. As shown in FIG. 5, the O.D. 336 of member 310 is normally spaced from the I.D. 191 of a mold housing means by the ball means 212 and 214. As can be seen in FIGS. 7, 8 and 9, the member 310 has a top surface 338 and an offset inward shoulder 340 connected by a vertical portion 339. Surface 338 is adapted to ride on inner shoulder surface 193 of the mold housing means. Surface 339 serves as a stop surface for engaging ring 199 which is firmly fixed to the mold housing in a groove defined by surfaces 195 and 197. Surface 340 of member 310 slides on the underside of ring 199 during outward movement of the quadrant. Surface 340 on the quadrant retainer member 310

(as seen in FIG. 5) forms a part of the mold cavity and will be engaged by the plastic material to provide a transverse stacking shoulder in the article 12a to be molded. It will be recognized that surface 340 is an optional shoulder and surface 342 immediately below surface 340 may join the ring 199 if a stacking ring is not desired. Surface 342 forms a portion of the side walls of the container and as may be perceived in FIG. 5, surface 342 is essentially vertically disposed rather than tapered although this surface may be configured with an inner or an outer taper if desired as well as in a manner to impart ornamentation.

Horizontal surface 344 on member 310 performs an important function in the operation of the quadrants. Surface 344 is disposed essentially transversely to the axis of the mold and is substantially parallel to top surface 338. Surface 344 serves as a stop surface to absorb the reaction force imparted by surface 272 on the third portion means of the mold means in a cascading of movement of members 312 through 322 as shall become apparent. Surface 346 on member 310 aligns and guides the next lower insert member 312 and further, together with surface 344 and the top surface of member 312 forms a channel-shaped radially outwardly extending rib forming groove g in the mold cavity.

Surface 350 of member 310 is offset from surfaces 342 and 346 to provide a chamber wall for movement of the elements 312 through 322 in addition to guiding the radially outboard complementary surface 402 of member 312. Surface 352 on member 310 which is parallel to surfaces 338 and 348, along with surfaces 350 and 348 provide a hollow segment of an annular chamber for the movable elements 312–322. Surface 354 on member 310, which is parallel to surfaces 342 and 346 serves to guide the lowest insert member 322 in its movement on the rod 324. Lower shoulder surface 356 rides on upper terminal surface 266 of the cylinder wall insert means, surface 358 engaging surface 262 of the cylinder wall insert to provide a stop and the lower surface 360 on member 310 rides in the offset groove surface 264 as best seen in FIG. 17.

As shown in FIGS. 7, 8 and 9, a bore 362 is centrally located on the segment 310 on surface 354, said bore 362 communicating with an axially aligned bore 364. The top surface 338 has a groove 366 formed therein with a through bore 368 intersecting the grooves 366, the bores 362, 364, 368 and the groove 366 cooperating with member 326 as shall be explained. It will be appreciated that side surfaces 370 and 372 will mate respectively with counterparts on the other segments the four quadrants, when in the position shown in FIG. 5 and FIG. 17, making a closed outline form of mold surface at surfaces 342, 240, and 344.

The spring retainer member 326 is formed with a pair of offset depending lugs 374 and 376 connected by extension portions 375 and 377 respectively. The depending lugs 374 and 376 fit within the bores 368 and 364 as shown in FIGS. 7 and 8 so that the central portion 378 of member 326 is spaced from the O.D. surface 336 of member 310 as shown in FIG. 8. Enlargements of the central portion 382 and 380 are also spaced from surface 336 and the width between surface 336 and the mid-portion of member 326 is such that spring member 206, shown in FIG. 16A, will fit therebetween. The height of member 326 is of such a nature that it will fit into apertures 198 and 200 in the mold housing so that the spring member 206 may bias member 310 outwardly when the spring is disposed in the grooves 194–196 in the manner shown in FIG. 16. Since the rods 324 mounting the insert members 312–322 are mounted in the member 310, the springs 206 effectively bias the individual quadrants 50 outwardly, the quadrants being positioned in their inward position by the balls 212 and 214 engaging the grooves 332 and 334. Obviously, the balls 212 and 214 are restrained in their inward position by the cam means 48 and are actuated in timed sequence to other movements of the apparatus in the manner that shall be explained.

Insert member 312 is fixed to member 310 for movement therewith in a radial direction and is movable relative thereto on the rods 324 in a vertical direction. Insert member 312 is shown in a fragmentary view in FIGS. 10 and 11 and has a first surface 384 with an upwardly extending portion which terminates in the top surface 388 there being a connecting surface 386 which is complementary to, fits against and slides relative to surface 346 on member 310. It will be seen that surface 388, surface 346 and surface 344 form a channel-shaped radially outwardly extending depression or groove g which is collapsible upon movement of surface 388 upwardly toward surface 344. Surface 390 on insert member 312 is substantially parallel to surface 342 and is offset radially inwardly therefrom. Surface 390 also forms a portion of the side walls of the container in the same manner as surface 342. Horizontally extending surface 392 forms a shoulder surface parallel to surface 344 and together with surface 394 and the top surface of insert member 314 form another channel-like radially outwardly extending groove f for forming a rib offset inwardly from the rib formed by the groove g on the container. The top surface of member 314 is movable toward surface 392 to cause the latter to move surface 388 toward surface 344.

Surfaces 396, 398 and 400 on member 312 provide a chamber for movement of the insert members 314 through 322 with surface 398 cooperating with the depending portion of member 314 similarly to the cooperation of 402 of member 312 with member 310. Shoulder surface 400 at the terminal end of member 312 provides an interlock function cooperating with similar lugs or shoulders on members 314 through 322 to in turn cooperate with lug 300 on the third portion means 38 as shall be explained. Outer surface 402 on member 312 rides upon and is guided by surface 350 of member 310. Bores 404 and 406 are aligned with bores 328 and 330 respectively in member 310 for receipt of the guide means rods 324 which extend therethrough. End surfaces 408 and 410 are aligned with surfaces 370 and 372 of the segment 310.

The grooves b through f are provided by insert members 314 through 320 which are essentially similar to insert member 312 except that the depending portions thereon as defined by portions similar to surfaces 398 and 402 are progressively shorter in axial height as can be seen in FIG. 5. As will be perceived, each insert member has a top mold surface and a bottom mold surface which cooperate respectively with the next above and next below insert members to define the spaced channels or grooves which are collapsible in the vertical direction. Each insert member 314 to 320 is so configured to be disposed in radially inwardly offset or stepped fashion from the above next adjacent insert member. Thus, connecting similar points on the individual insert members will result in a tapered relationship relative to the axis of the mold, such condition being necessary for a cup which is of the nestable variety.

The lowermost insert member 322 has a special configuration and fragmentary views thereof are shown in FIGS. 12 and 13, it being noted that FIG. 13 is turned at right angles, i.e., rotated 90°, from the position of a similar sectional view, FIG. 11, relative to FIG. 10. More particularly, the lowest insert member 322 has a top surface 412, as viewed in FIG. 5, which cooperates with insert member 320 next thereabove to form collapsible groove a similarly to surface 346 cooperating with member 310 to form groove g. Surface 414 of member 322 slides along and is complementary to the surface it engages on member 320 which is similar to surface 394 of member 312. Surface 416 on member 322 extends radially outwardly and terminates in a downwardly extending surface 416 comparable to surface 402 on member 312, surface 416 sliding on the inner surface of the depending portion of member 320. A shoulder 418 is offset inwardly and defined as the juncture between surfaces 417 and 420 for engaging the interlock lug means on the depending portion member 320 for returning the various insert members 312 to 320 to their initial position shown in FIG. 5, i.e., downward movement of shoulder 418 will cause member 320 to move downwardly to in turn cause member 318 to move downwardly etc.

Vertically extending inwardly offset surface portion 422 slides on surface 354 of the insert holder member 310 and the bottom surface 424 is normally spaced slightly above surface 266 for clearance purposes. Surface 430 of member 322 is offset inwardly from surfaces 426 and 434 and rides upon the O.D. of the third portion means 38 upper portion. Shoulder surface 432 cooperates with the lug 390 to positively withdraw the insert members to their position shown in FIG. 5 via shoulder 418 as aforediscussed. Surface 438 also rides on the O.D. of the third portion means of the mold means. Surface 440 of member 322 is disposed in direct opposition to surface 272 and along with portion 438 defines the lowermost channel-shape groove a for forming the lowest rib 14a on the container 12a. Surface 442 forms a portion of the side wall of the container and is comparable to surface portions 342 and 390 aforediscussed. End surfaces 344 and 346 of the insert member 322 are aligned with surfaces 408 and 410 there being through bores 448 and 450 for receipt of the rods 324 which also guide and retain the insert members for movement relative to and movement along with member 310.

As can be seen in FIGS. 5 and 6, the various insert members 312–322, the top surface 272 of the third portion means of the mold means, and the undersurface 344 of member 310 form channels a through g respectively for forming the ribs 14a on a container. Movement of surface 272 in an upward direction as shown in FIG. 6, causes plastic material trapped in the channel a to be squeezed together, the force then being transmitted through member 322 to channel b to in turn squeeze the plastic therewithin and so on with the cascading motion until channel g is closed up forming the plurality of projecting discrete ribs 14a on the container. Since it is virtually impossible to have exactly uniform thickness of plastic material disposed in the channels a–g during normal molding operations, it is of importance to note that the pressure in an upward direction supplied by the third portion means of the mold means is transmitted to all of the ribs sequentially and pressure will equalize on all of the ribs since shoulder 344 is fixed. This assures that all the ribs become completely formed independent of the variations of thickness that may accrue to the wall thickness of the plastic material in the channels a through g. As shown in FIG. 6, the rib a is formed first, and whether or not the plastic material that is disposed in the channel a self-adheres, is an interrelated function of the characteristics of the particular plastic involved, temperature of the plastic material and the mold temperature, the speed of movement of surface 272 upwardly after initial engagement of the plastic material with surface 272 and the other surfaces of the various channels and the pressure applied by the third portion means in upward movement thereof.

The movable cam means 48 essentially comprises a cylindrical upper member 452 having a lower radially outwardly extending boss portion 454 having an upper surface 455. The lower surface 456 of the portion 454 engages the top of the lower cam member 476 in clamping engagement as will be apparent. The inner surface 458 of the cylindrical portion 452 has an angularly divergent surface 460 which extends radially outwardly a short distance to define offset cylindrical surface 462. Surface 458 slides upon surface 180 of the mold housing, it being apparent that downward movement of member 453 will expose surface 462 to the aperture 202 so that the ball 212 may move outwardly into engagement with surface 462. The lower portion 454 is formed with a plurality of bores 464 and counterbores 466 for receipt of bolts 468 having heads 470 which fit within the counterbores 466, said bolts 468 being threaded at their lower ends in apertures 472 in a spring loaded plate 474. The lower cam means 476 also has an angularly divergent surface 478 and an offset surface 480 for cooperation with the aperture 204 and ball 214. Surface 481 also rides on the O.D. surface 180 of the mold housing.

The plate 474 is formed with a plurality of apertures such as 482 having guide grommets 484 located therewithin to receive guide rods 486. Only one of these guide rods 486 is shown in the drawings, it being realized that there are a plurality of said guide rods located around the mold platen depending upon the number of molds located on the mold platen. The rod 486 has an enlarged lower end 488 for fitting in a bore 490 in mold platen member 162. The head 488 is of lesser vertical height than the bore 490 so as to define a spring retaining chamber for one end of spring 492, the other end engaging the enlarged head of the guide grommet member 484 to bias the plate 474 upwardly. The bolts 468, which serve to clamp the upper and lower cam members 452 to the plate 474, assure that the cam means 48 is biased upwardly at all times by the springs 492.

A second bolt 494 having an enlarged head 496, fits within a bore and counterbore 498 in plate 474 to provide an upper limit stop for plates 474. The bolt 494 is threaded in a suitable aperture 500 in plate 162. It will be appreciated that the stop function of the head 496 of the bolt 494 can be incorporated into the rod 486 if desired, and in any event, it will be seen that the spring 492 biases the cam means upwardly at all times into engagement with the head 496 of bolt member 494, the plates 474 being movable downwardly against the bias of the spring 492 by the engagement of surface 144 of the lower clamp plate with surface 455 of portion 454 of the cam member 452. The lower limit of the travel of the plate 474 is defined in the instant device by surface 502 on the underside of plate 474 engaging surface 154 of the bushing surrounding the rod 140 for the lower clamp means.

While only a single mold and mandrel means have been discussed, it will be apparent that the structure is well adapted for a close packing of identical units on a single mold platen means and mandrel platen means. In such a multiple construction, the lower clamp plate 138, the cam plate 474, the various plates shown which make up the mold platen means 134 and the frame means 308 are common to all of the molds. Further, the various actuating portions for the clamp plate 138 such as the rods 140 are symmetrically spaced so that a balanced actuation is given thereto, there also being a plurality of guide posts 486 and stop members 494 for guiding and locating the cam plate 474.

An alternate construction is shown in FIGS. 3 and 4, said alternate construction being essentially concerned with the quadrant areas. FIG. 4 is essentially an enlargement of the construction shown in FIG. 3 with a slight modification on the insert member which merely affects the appearance of the side walls of the cups immediately below the individual ribs.

The essential differences between the quadrant construction shown in FIGS. 3 and 4 and that shown in FIG. 5 are that the quadrant 50 shown in FIG. 3 is a four rib producing quadrant, and it has no positive interlock to return the individual insert members 58 to their original position and thus, the mold means shown in FIGS. 3 and 4 must be aligned in a vertical plane since the members are returned to their downward positions under the bias of gravity. The housing or the fixed mold member 503 is modified to receive the insert holder member 504 which mounts the stepped guide pin 506, the quadrant being biased outwardly by the round headed pins 508 which are fixed to member 504 as shown in FIG. 3, the under side of the heads being engaged by the spring 510 to in turn be biased to engage the cam means 48. The cam means is loaded by a spring 512 which surrounds the mold and biases the cam upwardly to cause the quadrant 50 to remain in its radially inward position until the cam means 48 is moved downwardly against the bias of spring 512. The individual insert members 514, 516, 518 are mounted on the pin 506, the insert members being shown in a completely collapsed position in FIG. 3 and in an open position in FIG. 4. It will be realized that the parts never quite attained the position shown in FIG. 3 during normal operation due to the presence of plastic material intermediate the grooves formed by the various insert members. The structure shown in FIGS. 3 and 4 works well in practice when the molds are vertically aligned and when a dry lubricant such as graphite or the like is disposed between moving portions of the quadrant. The insert members 514, 516 and 518 do not have the depending portion thereon as do the insert members 314, 316, 318 as shown in FIG. 5 but their operative relationship is similar upon upward movement of the third portion means 38 of the mold means. The quadrant construction shown in FIG. 4 produces the cup 12 midportion shown in FIG. 2 whereas the construction shown in FIG. 5 produces the cup 12a shown in FIG. 2A.

*Operation*

The apparatus 10 is designed for continuous cyclical operation and FIG. 19 illustrates the position of the parts at the termination of one cycle and the beginning of the next cycle. Simultaneously with the ejection of the cup 12a from off of the top of the knock-out means 40 by the air pressure jet means 29, new heated sheet material 16 is indexed into position adjacent the upper clamp means 28. It will be noted that the mandrel means 24, bottom surface 132 is spaced above the material 16. It will also be noted that the mold means 32 is disposed downwardly in its lowermost position causing the end tion the latter in a downward relative position so that the head 304 of the knock-out means 40 presents the cup 12a so that it is clear of the sheet 16 and the top 158 of the mold housing member 156. The lower clamp means 30 is in its lowermost position with surface 144 engaging surface 455 of the movable cam means 48 so as to position the latter in a downward relative position so that grooves 462 and 480 thereon are aligned with the apertures 202 and 204 so that the quadrants 50 are each disposed in their radially outwardly second position under the influence of the biasing means springs 206. (It will be observed that the quadrants 50 have two positions, i.e., the first position being the radially inwardly position shown in FIG. 5 and in FIG. 20 and the radially outwardly position shown in FIG. 19 and FIG. 24.) The individual insert members 312 through 322 have four positions relative to the mold housing, i.e., the first position being the downwardly position thereof when the quadrants are in their radially inward first position; the second position being the upward or collapsed position (see FIG. 23) when the quadrants are in their first radially inward position; the third position being the radially outward position of the insert members when in their upward or collapsed position and the quadrants are in their radially outward position; and the fourth position being when the quadrants are in their radially outward second position and the insert members are in their downwardly position. For ease of discussion, the grooves $a$ through $g$ formed by the insert members have been denominated to correspond with the positions of the insert members in FIGS. 19–24, for example, when the insert members are in their first position shown in FIG. 20, the grooves have been denominated $a_1$, $b_1$, $c_1$, etc., and when they are in their fourth position, as shown in FIG. 19, the grooves have been denominated $a_4$, $b_4$, $c_4$, etc.

It will be noted that the quadrants 50, when in their second position, i.e., radially outwardly position, have surface 336 of the insert holder member 310 in engagement with surface 191 of the mold housing 156. In this position, surface 339 on the insert member is spaced from the back side of the ring insert 199 and surface 342, on the insert holder member, is now radially outwardly from the smallest diameter of the ring 199 which allows the uppermost rib 14a on the container 12a formed by the groove $g$ to clear surface 344 (see FIG. 5) for ejection to the position shown in FIG. 19. It will be further noted in FIG. 19 that the lug 300 engaging surface 342 of the lowermost insert member 322 is in its downward position indicating that the third portion means 38 of the mold means is in its lowest relative position to the mold housing portion 156 which forms the first portion means 34 of the mold means 32.

As aforementioned, the actuators for the movements of the various portions of the mandrel and the mold and the associated clamp means may be mechanical or hydraulic, the latter being preferred for versatility in changes required for different shapes and sizes of containers.

Immediately after the blowing of the cup 12a from the molding area by the blast of air from the jet source 29, the lower clamp means moves upwardly to the position shown in FIG. 20. It will be noted that the lower clamp means moves independently of the mold means 32 to clamp the material 16 between the lower clamp means and the upper clamp means 28. The mold means 32 remains in its downwardly position. The cam means 48, due to the movement of the clamp means 30 returned to its upwardly position so as to cause in turn the quadrants 50 to move to their second from their first radially inward position which causes the individual inserts to move from their fourth to their first position. Thus, the grooves $a$ through $g$ are in positions $a_1$, $b_1$, $c_1$, etc.

The parts now move from the position shown in FIG. 20 toward the position shown in FIG. 21 as follows: surface 132 of the plug 116 under the influence of the actuator means 26 for the mandrel platen means 72 engages the material 16 and mechanically draws the material into a mechanically preformed shape where it closely hugs the outer periphery of the plug 116. This mechanical drawing takes place prior to and during upward movement of the mold means 32 by the actuating means 46. (This portion of the operative cycle is more particularly described in the copending application entitled, "Forming Machine," aforementioned.) The spring 124 in the mandrel means 24 is relatively powerful and of sufficient strength such that the plug 116 does not move relative to the mandrel platen means 72 during this stage of the operation. The mold means 32 moves upwardly into engagement with the material drawn on the mandrel means 24, the mold platen means 134 attaining the relative position shown in FIG. 21. In this portion of the cycle it is important that the mechanically predrawn material not touch the chilled surfaces of the mold means to prevent marring or distortion of the thickness of the container sidewalls in an undesirable manner. The mold means 32 first touches the mechanically predrawn material in the lip area of the container just prior to the mold and mandrel means attaining the relative vertical position shown in FIG. 21. When the mold means reaches the position shown in FIG. 21 relative to the mandrel means, the material of the mechanically drawn preform is firmly sealed and clamped by surface 90 of the cutoff and sealing means member 84 of the mandrel means 24 and surface 166 of the mold housing member 156. It will be noted that the knock-out means 40 is now at the bottom of the mold cavity, the quadrants 50 are in their first radially inward position, the inserts being in their first position so that the grooves $a$ through $g$ are in their first $a_1$, $b_1$, $c_1$ positions etc. It will be further noted that surface 132 of the mandrel means is spaced from the head 304 of the knock-out plug a short distance. It will be further noted that surface 144 on the lower clamp means 30 is spaced from the upper surface 455 of the offset portion of the cam means 48 during this portion of the cycle, which of course, assures that the quadrants 50 remain in their radially inward position. Further, the movable mold member 268 is engaging the upper surface of cylinder insert member 218 so as to be located in its lowermost position.

When the parts of the apparatus 10 have moved from the position shown in FIG. 20 to the position shown in FIG. 21, air pressure is admitted through the mandrel passage 86, ports 100 and 106 to cause the plastic material hugging the plug 116 to leave the mandrel plug 116 and engage the mold cavity first, second and third portion means 34, 36 and 38 while they are in the positions shown in FIG. 21. Air that would normally be trapped between the mold cavity portions and the mold side of the sheet material is vented around the head 304 of the knock-out means 40 through passageways 298–296, 240 and 242 as shown by the arrows. A preformed container 12b is thus formed which is complementary in shape to the mold cavity outline as defined by the first, second and third portion means 34, 36, and 38 in their extended relative positions. Each of the channel grooves $a_1$–$g_1$ will have plastic materials blown therewithin, the plastic sheet material engaging the various insert means forming the grooves $a_1$ through $g_1$ respectively. It will be appreciated that the vertical height of the individual grooves $a_1$–$g_1$ is greater than twice the thickness of the sheet material therewithin and further, as shown in FIG. 6, the sheet material does not completely fill the corners of the grooves. The preform container 12b has a greater volume and a greater axial height than the finally formed container 12a, the same situation accruing with the quadrants shown in FIGS. 3 and 4 for forming the cup 12.

Almost instantaneously, after the admission of air pressure from the source 64 through the mandrel, air or hydraulic pressure is admitted through the mold platen means and ports 247, 248 to the face groove 244 in the cylinder insert member 218 which engages surface 288 on member 268 to cause the third portion means 38 on the mold means to rapidly move upwardly as shown in FIG. 22. Surface 272 at the top of member 268, of course, moves upwardly to engage the plastic in groove $a$ to collapse and fold same and transmit the force to the next groove $b$ and so on until all grooves attain their fully collapsed positions $a_2$ through $g_2$. The collapsing causes compressing and folding together of the material that is trapped in the grooves to provide the ribs 14a on the container 12a. It will be noted that the bottom of the container 12b is moved upwardly as a unit and in effect the side walls of the container in the grooves $a_1$ through $g_1$ are folded together. If the third portion means 38 does not move upwardly almost instantaneously subsequential to the material engaging the chilled mold cavity 32 to form the preform container 12b to its final shape 12a more pressure is required since the material has a chance to set up and an action more akin to "cold" forming takes place (which may on occasion be desirable). Depending upon the temperature of the chilled mold means 32, the temperature, characteristics and thickness of the plastic material 16 disposed in the grooves $a_1$ through $g_1$, the speed or time lag of the movement of the third portion means 38 upwardly relative to the impingement of the material 16 on the mold means, and the pressures applied through source 46, the material 16 disposed in the groove may fold so as to self-adhere. For the container 12a it is preferred that at least the material will be relatively tightly folded so that the material that is adjacent the upper portion of the groove is disposed in close adjacent proximity to the material in the lower portion of each groove. The folded material in the grooves provides the radially projecting rings or rib portions 14a which are essentially double wall in thickness. (In practice since the material leaving the side walls of the plug 116 had to be in a sense stretched further to go into the various radial grooves $a$ through $g$, and thus is "thinner," the thickness of the material of the ribs 14 is usually slightly less than double the thickness of the material of the side walls immediately adjacent to the ribs.) The ribs 14a impart great structural strength and insulating qualities so that a very small gross amount of plastic is used for an insulated type throw-away container.

It will be noted that as the third portion means 38 is moved upwardly, the head 304 of the knock-out means 40 is moved therewith so that the material in the bottom of the container re-engages the end 132 of the mandrel means 24, thus causing the compression of spring 124 and the separation of shoulder 128 on the plug 116 from the washer 114 through the lost motion connection that is provided. The reason for having the lost motion connection in the mandrel means 24 allowing the plug to move upwardly at this stage of the operation relates to the fact that a more uniform wall thickness on the container is attained when the mechanically predrawn shape closely approximates the initial shape of the mold cavity. It will be further observed in FIG. 22 that the ports 106 for the air pressure into the mandrel means remain open after the plug has been partially collapsed so that air pressure may be maintained while the third portion means 38 is moving upwardly. Depending upon the configuration of the article being molded, it is sometimes desirable to maintain air pressure on the plug side of the container during actuation of the third portion means 38 to prevent buckling of the material during the folding of the side walls. It will be further observed that the cam means 48 maintains the quadrants 50 in their radially inward first position during this stage of the operation, the inserts individually moving to their positions $a_2$ through $g_2$. Also all of the grooves $a_2$ through $g_2$ will have uniform pressure on the material independent of the wall thickness due to the geometry of the parts involved, the pressure equalizing between the shoulder 344 and shoulder 272 thus assuring that all of the ribs 14a will be completely formed.

While the parts are in the position shown in FIG. 22 and immediately after the upward movement of the third portion means 38, the lower clamp means 30 and the mandrel platen means 72 preferably are actuated to move downwardly as shown in FIG. 23 (not necessarily in a particular sequence). The downward movement of the mandrel platen means causes surface 90 to cut off the formed container 12a from the sheet material 16. The downward movement of the lower clamp means 30 causes surface 144 to engage surface 455 moving the cam means 48 downwardly which will allow the individual quadrants 50 to move to their radially outward second positions. It is important to note that the third portion means 38 remains in its upper position shown in FIG. 21 while the clamp means 30 is moving downwardly to cause the cam ring to move downwardly to allow the quadrants to move outwardly when the quadrants 50 are of the type shown in FIG. 5. Thus, there is a straight radial movement of the individual insert members 312–322 from their second or collapsed position to a radially outward position while still in the upper positions. Thus, the individual quadrants will clear the fins formed on the cups without injuring same which would occur if the lug 300 was actuated downwardly before the ribs were cleared. It will be further noted in FIG. 23 that the plug 116 is collapsed still further relative to the mandrel means 72 during the cutoff and thus, the lost motion connection must be designed to accommodate this.

The air pressure through the mandrel is preferably turned off during the "cutoff" procedure and after cutoff is completed the mandrel platen is withdrawn rapidly as shown in FIG. 24. Also at this time the pressure to the third portion means 38 is relieved.

As the pressure recedes from the means 46, as shown in FIG. 24, the third portion means 38 returns under the bias of spring 56 toward its original position, it being noted that the quadrants 50 are in their radially outer second position. The recession of the third portion 38 causes lug 300 to move the inserts 312–322 to their fourth position. It is important to move the inserts 312–322 on the quadrants shown in FIG. 5 downwardly while in their radially outward position (from their third to their fourth positions) to assure that there will be no binding or cocking of the edge surfaces of the inserts on the respective quadrants relative to the inserts on the other quadrants. The mold means 32 recedes to the position shown in FIG. 19 and the mandrel means 24 returns to the position shown in FIG. 19 allowing the cup to be ejected through the open mouth of the mold means. It is feasible and contemplated to mechanically engage the end 278 of the third portion means while in its upper position to positively restrain same until after the quadrants are in their radially outward position, such construction not being shown. This, of course, does not apply to quadrants of the type shown in FIGS. 3 and 4.

It will be noted that the radial movement of the individual quadrants is all within the mold housing which allows a close packing of a plurality of molds on the mold platen means 134. It will be further observed that the interlocking structure for returning the quadrants to their original downwardly position allows the molds and mandrel means to be disposed in any desired attitude. Also all of the basic movements of the forming machine are in a single plane, thus eliminating side action types of movement and separate actuating means therefor.

The method and apparatus just described is particularly efficacious for working with relatively thin heated thermoplastic material. While a particular container has been shown and decribed it will be appreciated that the essence of the molding method is to provide an irregular side wall surface which may be collapsed to provide a folding thereof to provide a sharply divergent projecting portion (closed or partially closed). The irregular configuration of the mold cavity may be chilled for faster molding cycles and the actuation of the collapsed inserts preferably accomplished almost immediately after engagement of the material thereto. Further, the method is particularly well adapted for fast automatic operation (but not limited thereto) since the container may be ejected through a wide mouth type of the cavity without using a side action type of operation usually associated with split molds. Obviously the method and apparatus is equally efficacious for narrow neck articles and split molds.

Although various embodiments of the invention have been shown and described, it is with full awareness that many modifications thereof are possible. The invention, therefore, is not to be restricted except insofar as is necessitated by the prior art and by the spirit of the appended claims.

I claim:

1. Mold insert means for a sheet material mold comprising guide and retaining means having a predetermined axis, a plurality of movable mold members mounted on said guide and retaining means for limited movement thereon relative to each other and to said guide and retaining means, said mold members defining a closed figure in space presenting a mold surface when said guide and retaining means are disposed in their initial position prior to movement thereof in a direction transverse to said axis, each of said mold members comprising one quadrant of a conical figure and disposed in stepped relationship to each other as measured along said axis, means biasing said mold members to a first predetermined position whereby surfaces on each of said mold members are spaced in opposition to surfaces on the next adjacent movable member, means operable to move said movable members against said bias to cause said surfaces on said movable members to move closer to each other in a direction parallel to the axis of said guide and retaining means, and means for moving said guide and retaining means and thereby said movable members as a unit in a direction transverse to the axis of said guide and retaining means whereby said movable members may squeeze sheet material located against said surfaces in opposition to each other toward each other and said movable insert members may then be moved out of contact with said sheet material.

2. Apparatus for forming a thin wall container from thin heated thermoplastic sheet material, comprising mandrel means for mechanically drawing the thermoplastic material, mold means cooperable with said mandrel means and said thermoplastic material and being characterized by side walls defining a hollow cavity and having first, second and third portion means defining the initial mold cavity outline, mold platen means mounting said mold means, said first portion means being relatively fixed to said platen means and defining an upper portion of the mold cavity, said third portion means defining the bottom of the mold cavity and being relatively movable to said platen means along the axis of the cavity, said second portion means being intermediate said first and third portion means, said second portion means having first and second subportions relatively movable to each other along the axis of the mold cavity and movable as a unit radially of the mold cavity, means for introducing fluid pressure to one side of the thermoplastic material to cause separation of the thermoplastic material from the mandrel means and engagement thereof with the mold means, means for causing movement of said third portion means relative to said first portion means to in turn cause said first and second subportions of said second portion means to move relative to each other, and means for causing said second portion means to move radially of the axis of said mold means after actuation of said third portion means whereby thermoplastic material engaging said second and third portion means of said mold cavity means are displaced axially to cause formation of rib means in the side walls of a container and the second portion means is moved out of engagement with the rib means so formed for egress of the container from the mold cavity.

3. The apparatus set forth in claim 2 wherein said mold cavity is generally frusto-conical in shape, said first portion means of said mold means has a mold cavity surface defining a closed substantially conical figure in a plane generally transverse to the axis of the cavity and of a first predetermined size, said third portion means of said mold means also defining a closed substantially circular figure in space as viewed in a plane transverse to the axis of the mold cavity and being of a smaller predetermined size relative to said first predetermined size, said second portion means when in its initial position also defining a closed substantially circular figure as viewed in the plane transverse to the axis of the mold and also being of a size smaller than said first predetermined size.

4. The apparatus set forth in claim 3 wherein said second portion means is formed in quarters, each of which having first and second subportions, said first and second subportions being movable on said individual quarters while maintaining a circular closed figure mold outline surface with similar subportions on the other quarters during simultaneous movement of said individual first and second subportions to cause axial displacement of the thermoplastic material, the quarters and thus the subportions being movable radially outwardly from the axis to form a discontinuous mold outline surface.

5. The apparatus set forth in claim 4 wherein the radial movement of each of said quarters in a radial direction to clear contact with the thermoplastic material is a limited movement, the maximum being defined by the differential in dimensions between the initial size of said second portion means and the size of said first portion means when said second portion means is in its radially inward position whereby a plurality of identical mold means may be closely mounted on said mold platen for simultaneous molding of a plurality of plastic articles with a minimum of scrap.

6. The apparatus set forth in claim 2 wherein said third portion means of said mold means is cup-shaped in configuration to define the bottom and the lower portion of the side walls of the mold cavity, the upper portion of said third portion means defining a shoulder generally parallel with the bottom wall surface of said mold cavity, said shoulder being disposed radially outboard and axially offset from said bottom wall portion, said first subportion of said second portion means having a first shoulder surface initially disposed in opposition and in spaced relation to said upper shoulder portion of said third portion means, said first subportion further having a second shoulder surface spaced from its first mentioned shoulder surface in both an axial and a radial direction, said first subportion of first shoulder being spaced from said upper shoulder on said third portion means a dimension greater than twice the cross sectional thickness of the sheet material when said first and second portions of said mold means are in their initial position whereby sheet material on the preformed container is disposed in a channel-like form in engagement with each of said shoulders on said third portion means and on said first subportion, said material being squeezed together by actuation of said third portion means along the axis of the container.

7. The apparatus set forth in claim 2 wherein the mandrel means has an initial position relative to a mandrel platen means so as to mechanically draw and preform a container with the bottom wall thereof close to but slightly spaced from said third portion means of said mold means prior to introduction of the fluid pressure, lost motion means connecting said mandrel means to said mandrel platen means, said lost motion means collapsing upon movement of said third portion means of said mold means along the axis of the container whereby the volume of the container may be reduced during the formation of the ribs thereon without movement of the mandrel platen means.

8. The apparatus set forth in claim 7 wherein said lost motion means further accommodates movement of sheet severing means fixed to said mandrel platen means, said severing means being concentric to said mandrel means and operable to sever said article after reduction of the volume of said container by movement thereof opposite in direction to the movement of said third portion means of said mold means.

9. The apparatus set forth in claim 2 wherein said third portion means of said mold means is biased away from said first portion means of said mold means and is operable to move against said bias toward said first portion means timed in relationship to movement of said mandrel means.

10. The apparatus set forth in claim 9 wherein said third portion means of said mold means is formed with means for receiving and carrying article ejection means along therewith when said third portion means is engaging said second portion means of said mold means, said article ejection means being relatively movable to said third portion means to eject the container from said mold means.

11. The apparatus set forth in claim 9 wherein said third portion means of said mold means is actuated by fluid pressure against the bias of said biasing means.

12. The apparatus set forth in claim 2 wherein said first portion means of said mold means is a mold housing characterized as being generally cylindrical in nature and having an upper portion spaced from said mold platen defining the open mouth lip portion of the mold cavity, a portion of side walls of said mold housing being offset radially outwardly from said lip portion, cylinder wall insert means concentrically mounted within said mold housing adjacent the lower end thereof, said third portion means of said mold means having a cylindrical portion engaging and riding upon the side walls of said cylinder side wall insert for movement relative thereto, and means for introducing fluid under pressure to a portion of said third portion means of said mold means whereby said third portion means of said mold means acts as a movable plunger of a fluid pressure actuated cylinder.

13. The apparatus set forth in claim 2 wherein the mandrel means comprises plug means having a first end surface and side walls extending upwardly therefrom for engaging and drawing the heated sheet material, mandrel platen means for moving said plug means, and mounting means for mounting said plug means to said platen means characterized as including lost motion means including spring means, said lost motion means normally positioning said plug means in a predetermined position relative to said platen means for the initial engagement with and drawing of the sheet material, said spring means having a force great enough to mechanically draw the material and maintain the predetermined relative position to the plug during the drawing of the material, said spring means permitting relative motion between the plug means and the mandrel platen means when said third portion means of said mold means causes the material adjacent the bottom and engagement with said third portion means of the mold means to re-engage the plug means to compress said spring means whereby the volume of the container may be reduced during formation of the ribs while maintaining a substantially uniform wall thickness adjacent the bottom portion of the container.

14. The apparatus set forth in claim 2 further including clamp means for engaging opposite sides of the thin heated thermoplastic sheet material prior to the mechanical drawing thereof by the mandrel means, said clamp means being cooperable with said mold means second portion means to afford movement thereof to its radially outward position.

15. The apparatus set forth in claim 14 wherein said mold means further includes cam means engageable with said second portion means of said mold means and operable in a first position to maintain said second portion means of said mold means in its radially inwardly position and operable in its second position to afford movement of said second portion means of said mold means to its radially outward position, said clamp means being operable to move said cam means from its first to its second position.

16. The apparatus set forth in claim 2 wherein cam means is surroundingly disposed to said mold means and in engagement with said second portion means of said mold means for controlling the radial position of said second portion means of said mold means, means biasing said cam means to a first position for maintaining said second portion means of said mold means in its radially inward position, and means operable against said bias for moving said cam means to a second position operable to afford movement of said second portion means to its radially outward position.

17. The apparatus set forth in claim 16 wherein means is provided for insuring return of said third portion means of said mold means to its original position furthest removed from said first portion means of said mold means prior to movement of said cam means from its second position to its first position for positioning said second portion means of said mold means in its radially inward position.

18. The apparatus set forth in claim 2 wherein said second portion means of said mold means is in the form of four circular segments having movable subportions thereon, said movable subportions having a rectilinear movement during the cycling of the apparatus, said subportions having a first position prior to engagement of the surfaces thereof by plastic material, having a second position spaced from said first position parallel to the axis of the cavity when said third portion means of said mold means engages said second portion means of said mold means during formation of said projections, said subportions having a third position radially outboard of said second position permitting ejection of the container, said subportions having a fourth position vertically below said third position and radially outboard of said first position prior to returning to said first position to afford accurate return of the parts to their initial position during movement from said fourth position to said first position.

19. The apparatus set forth in claim 2 wherein said mandrel means is located above the sheet material and said mold means is located below the sheet material and said first and second subportions of said second portion means of said mold means returns to their initial positions after actuation thereof by said third portion means under the influence of gravity.

20. The apparatus set forth in claim 2 wherein means is provided for positively returning said first and second subportions of said second portion means of said mold means to their original positions after ejection of the container from the mold cavity.

References Cited
UNITED STATES PATENTS

| | | |
|---|---|---|
| 3,050,773 | 8/1962 | Hagen _____ 264—296 X |
| 3,059,810 | 10/1962 | Edwards. |

FOREIGN PATENTS

| | | |
|---|---|---|
| 1,227,505 | 8/1960 | France. |

ROBERT F. WHITE, *Primary Examiner.*

A. R. NOË, *Assistant Examiner.*